(12) United States Patent
Terlizzi et al.

(10) Patent No.: US 9,240,700 B2
(45) Date of Patent: Jan. 19, 2016

(54) CASCADING POWER FOR ACCESSORIES

(75) Inventors: Jeffrey J. Terlizzi, San Francisco, CA (US); Jonathan J. Andrews, San Jose, CA (US); Alexei Kosut, Mountain View, CA (US); James M. Hollabaugh, San Jose, CA (US); Zachary C. Rich, Sunnyvale, CA (US); Daniel J. Fritchman, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 529 days.

(21) Appl. No.: 13/607,446

(22) Filed: Sep. 7, 2012

(65) Prior Publication Data

US 2014/0070774 A1 Mar. 13, 2014

(51) Int. Cl.
*H02J 7/04* (2006.01)
*H02J 7/16* (2006.01)
*H02J 7/00* (2006.01)

(52) U.S. Cl.
CPC ............... *H02J 7/007* (2013.01); *H02J 7/0004* (2013.01); *H02J 2007/0001* (2013.01); *H02J 2007/0098* (2013.01)

(58) Field of Classification Search
CPC ............... H02J 2007/0001; H02J 13/0062; H02J 2007/0098; H02J 7/0013; H02J 1/00; B60L 11/1838; B60L 11/1846; B60L 2230/16; Y02T 10/7005
USPC ................................................ 320/116, 124
See application file for complete search history.

(56) References Cited

U.S. PATENT DOCUMENTS

| 5,349,535 | A | 9/1994 | Gupta |
| 5,606,242 | A | 2/1997 | Hull et al. |
| 5,938,712 | A | 8/1999 | Ibamoto |
| 6,122,749 | A | 9/2000 | Gulick |
| 6,191,552 | B1* | 2/2001 | Kates ............... H02J 7/0021 307/155 |
| 7,340,167 | B2 | 3/2008 | McGlaughlin |
| 7,501,792 | B2 | 3/2009 | Borjeson et al. |
| 2008/0256598 | A1* | 10/2008 | Diab ............................ 726/2 |
| 2009/0146610 | A1* | 6/2009 | Trigiani ..................... 320/119 |
| 2009/0210357 | A1 | 8/2009 | Pudar et al. |
| 2010/0070659 | A1* | 3/2010 | Ma et al. ..................... 710/14 |
| 2010/0295503 | A1 | 11/2010 | Bourilkov et al. |

(Continued)

FOREIGN PATENT DOCUMENTS

| CN | 102103470 A | 6/2011 |
| CN | 102428620 A | 4/2012 |
| WO | 2009050625 A2 | 4/2009 |

OTHER PUBLICATIONS

International Search Report and Written Opinion mailed on Jul. 25, 2013 for PCT Patent Application No. PCT/US2013/04644, 9 pages.

(Continued)

*Primary Examiner* — Nghia Doan
(74) *Attorney, Agent, or Firm* — Kilpatrick Townsend & Stockton LLP

(57) ABSTRACT

Methods, systems, and apparatuses for charging a host device from a charging source through an accessory are described. Upon detecting an input power signal from the charging source, an accessory may send an identification request to the host device and authenticate the host device based on the identification information received from the host device. Upon authenticating the host device, the accessory may enable a power path between the charging source and the host device to supply a charging current to charge the host device.

21 Claims, 11 Drawing Sheets

(56) References Cited

U.S. PATENT DOCUMENTS

2011/0167176 A1* 7/2011 Yew et al. .......................... 710/6
2011/0302430 A1* 12/2011 Boss et al. .................... 713/310

OTHER PUBLICATIONS

Extended European Search Report, EP App. No. 13162314.2, Mailed Feb. 12, 2014, 6 pages.
Office Action for Australian Application No. 2013202624, mailed Aug. 8, 2014, 3 pages.
Office Action for Taiwanese Patent Application No. 102113180, mailed Jan. 8, 2015, 19 pages.
International Preliminary Report on Patentability mailed on Mar. 19, 2015 for PCT Patent Application No. PCT/US2013/034844, 9 pages.
Office Action for Taiwanese Patent Application No. 102113180, mailed Jun. 11, 2015, 14 pages.
Office Action for Australian Application No. 2013202624, mailed Jul. 30, 2015, 3 pages.

* cited by examiner

CASCADING POWER FOR ACCESSORIES

BACKGROUND

The present disclosure generally relates to accessories that interoperate with portable computing devices, and in particular to the connection of multiple accessories to one or more portable computing devices.

In recent years, a number of portable computing devices (PCDs) have been developed. Examples of PCDs include portable media players, mobile phones, personal digital assistants (PDAs), portable e-mail devices, tablet computers, video game players, portable navigation units relying on Global Positioning System (GPS) satellite data, and multi-function devices that can integrate numerous functions such as media storage and playback, mobile phone, Internet access, e-mail, personal information management, game play, GPS/navigation capability, and the like. Examples of multi-function PCDs include various iPhone®, iPad® and iPod® models manufactured and sold by Apple Inc., assignee of the present application, as well as other portable electronic devices made and sold by other manufacturers and distributors under their respective brand names.

Along with the development of PCDs, accessories have also been created for use with the PCDs. Such accessories can communicate with a PCD using one or more connectors and/or communication interfaces. Accessories can be used to control features of a PCD or be used by a PCD to interact with users and/or the environment. In some instances, multiple accessories can be used concurrently with a PCD. For example, an accessory such as a speaker dock can be docked with a PCD to play audio from a media file such as a movie stored in the PCD, and another accessory such as an external display can be connected to the speaker dock or the PCD to play video from the same media file. In other instances, an accessory can be used concurrently with multiple PCDs. For example, an accessory such as a hub can be used to connect multiple PCDs together to share data and information among the PCDs.

SUMMARY

Certain embodiments of the present invention relate to connection of multiple accessories to one or more host devices such as portable computing devices (PCDs). In some embodiments, two or more accessories can be connected to a host device in a daisy chain topology, with the host device at one end of the daisy chain. In some embodiments, one or more host devices can be connected to an accessory in the daisy chain. At least one intermediary accessory (also referred to herein as a "relay" or "relay accessory") provides a first connector or port that can be used to connect to another accessory (which may or may not also be a relay accessory), and a second connector or port that can be used to connect to a host device or an additional accessory (which may or may not also be a relay accessory). Thus, any number of accessories can be incorporated into a daisy chain. Each connected accessory (including the relay accessories) can interact with a host device. Thus, each connected accessory can invoke host device functionality, have its own functionality invoked by a host device, receive media content or other information from a host device, deliver media content or other information to a host device, and so on. Concurrently with its own interaction with a host device, each intermediary accessory can also act as a relay for other accessories in the daisy chain, directing commands, data and other signals between a host device and the other accessories, and thereby allowing the other accessories to interact with a host device through the intermediary accessory. In addition, in some embodiments, streaming signals (e.g., audio and/or video signals) can be routed from a host device to various accessories along the daisy chain.

In one embodiment, an accessory acting as a charging source for charging a host device can be connected to the host device through one or more intermediary accessories. For example, a host device may be a mobile phone, a tablet, a portable media player/reader, or a portable computing device. A charging source may be a power adapter, a power brick, a charger block, or a charging station that can be connected to a power source such as an electrical outlet or an external battery to charge a host device. One way to ensure compatibility between a host device and a charging source is to authenticate the power source by the host device before the charging source enables a power path to supply a charging current to charge the host device. For example, the charging source can be authenticated by sending identification (ID) information identifying the charging source to the host device. Alternatively, the host device can send ID information identifying the host device to the charging source.

In the instance where the battery of the host device is dead (i.e. the battery is completely drained, or the battery is drained to the extent that the circuitry of the host device responsible for sending the ID information cannot properly operate when using the battery as a power source), the host device may be incapable of authenticating the charging source. In such a scenario, the charging source can supply a limited current to the host device to enable circuitry in the host device to authenticate the charging source when the battery of the host device is dead.

However, if the host device is being used in a system with one or more intermediary accessories, such as a docketing station, a hub, or a speaker dock, that are coupled between the host device and the charging source in a daisy chain, the limited current provided by the charging source may be inadequate to enable the circuitry of the host device to send the ID information due to loses along the path through the intermediary accessories. As a result, a user would have to go through the inconvenience of physically disconnecting the host device from an accessory, and reconnecting the host device directly to the charging source to charge the host device.

Accordingly, in some embodiments of the invention, an accessory can be authenticated by a charging source such that the charging source would enable a power path to the accessory without first requiring authentication of a host device that is coupled downstream to that accessory. This allows the accessory to be powered through the power path such that the accessory can adequately provide a limited current to the next accessory to enable authentication of the next accessory. The accessory can authenticate the next accessory and enable a power path to power that next accessory. In this way, each accessory along the daisy chain towards the host device from the charging source can be authenticated and be powered in a cascading manner to enable each accessory to provide an adequate limited current to the next device along the chain.

The accessory that is directly connected to the host device can likewise be powered after being authenticated by the preceding accessory. As a result, instead of receiving a diminished limited current, the accessory directly connected to the host device can be sufficiently powered such that the accessory can provide an adequate limited current to the host device to enable authentication of the host device. Thus, even when the battery of the host device is dead, it is not necessary to disconnect the host device from the accessory and reconnect the host device directly to the charging source to charge the host device.

The following detailed description, together with the accompanying drawings will provide a better understanding of the nature and advantages of the present invention.

DETAILED DESCRIPTION

Figure 1:
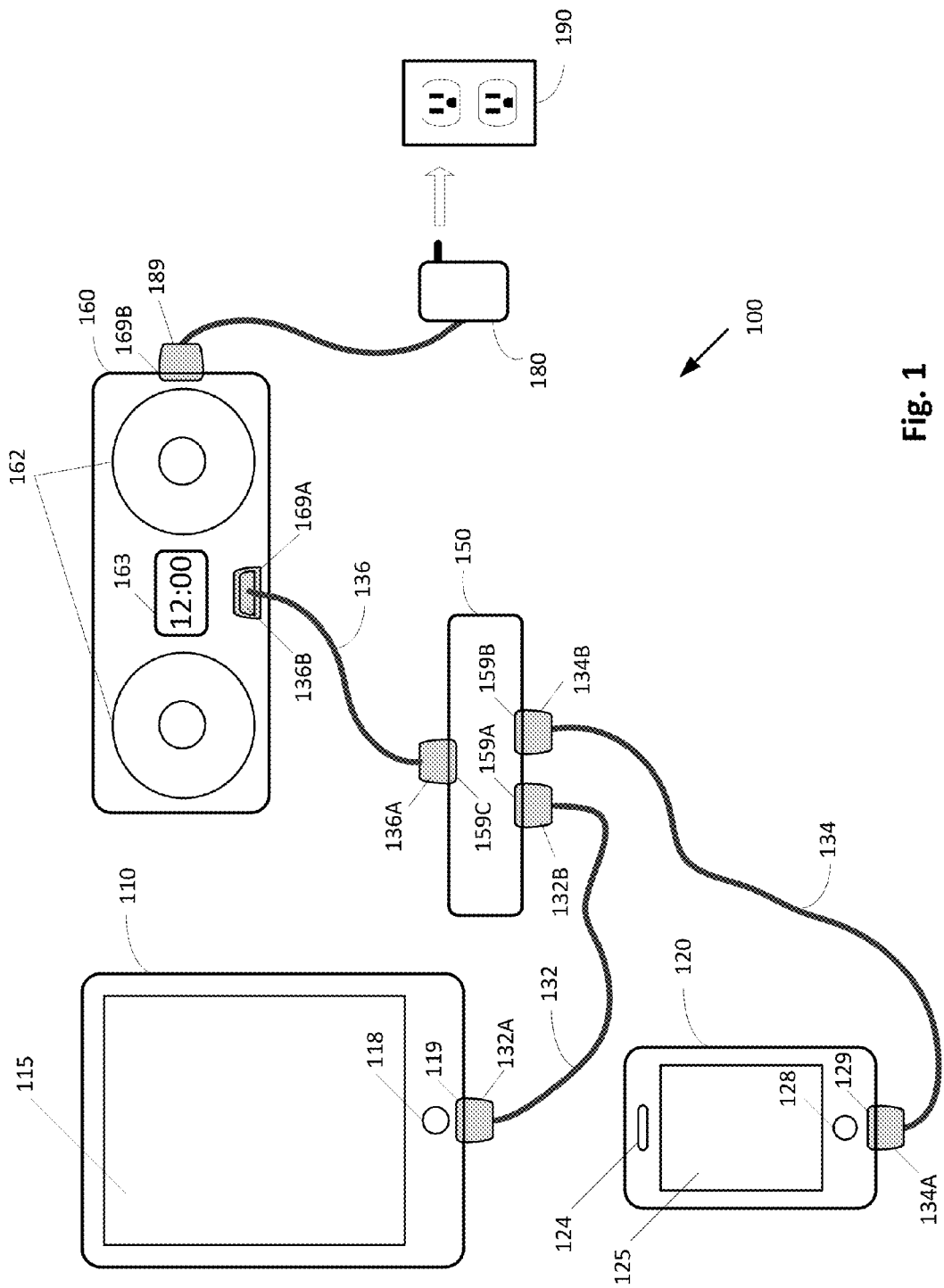
FIG. 1 illustrates a system with multiple accessories coupled to host devices according to one embodiment of the present invention.

Embodiments of the present invention relate to connection of multiple accessories to one or more host devices. In some embodiments, a host device can be connected to one end of a daisy chain of accessories. In some embodiments, an accessory in the daisy chain can connect to one or more host devices. The daisy chain may have one or more intermediary accessories or relay accessories that each provides a connector or port for connecting to an accessory upstream from the intermediary accessory, and another connector or port for connecting to a host device or another accessory downstream from the intermediary accessory. Some accessories may provide additional connectors or ports to connect to one or more additional host devices and/or accessories. Each accessory in the daisy chain can interact with a host device and/or the other accessories. Thus, each accessory in the daisy chain can be used to control the features and functionality of a host device, be used by a host device to interact with users and/or the environment, and/or exchange data and other information with a host device and/or the other accessories.

To ensure each of the accessories in the daisy chain is a compatible and valid accessory that can be used with the host device, each accessory can authenticate or be authenticated by its adjacent device(s) which may include a host device and/or another accessory. An accessory or a host device can be authenticated by another device (which may be another accessory or another host device) by receiving an ID request from that device, and by sending ID information about the accessory to that device in response to the ID request. The ID information can be used by that device to determine if the accessory is a valid accessory that the device can interoperate with. Similarly, an accessory or a host device can authenticate another device (which may be another accessory or another host device) by sending an ID request to that device, receiving from that device ID information about the device, and determining if that device is a valid device based on the ID information received from that device.

A host device can be any type of computing and/or communication device such as a mobile phone, a tablet, a portable media player/reader, a laptop, a netbook, an ultrabook, a personal digital assistant (PDA), a portable gaming device, or any type of portable computing device (PCD). An accessory can be any type of device that can interoperate with a host device. Examples of an accessory may include a docking station, a hub, a cable, a dongle, a charger (e.g., a power adapter, a charging station, a charger block, a power brick, etc.), an external speaker dock/system, an external video device (e.g., a display monitor, a projector, etc.), an input device (e.g., a keyboard, a mouse, a microphone, a game controller, etc.), a multimedia device, a consumer electronic device (e.g., an alarm clock, etc.), a musical instrument (e.g., a digital piano), a home appliance (e.g., refrigerator, dishwasher, etc.), exercise equipment, a security system, a home or office automation system, a camera, a measurement device, a medical device (e.g., a glucose monitor, an insulin monitor, etc.), a point of sale device, an automobile, an automobile accessory (e.g., a car stereo system, car navigation system, etc.), a radio (e.g., FM, AM and/or satellite), an entertainment console on a transportation vehicle, or any combination of such devices.

Some embodiments of the present invention relate to connection of a host device to a power source through a daisy chain of accessories. The power source (e.g., an electrical outlet, an external battery, etc.) can provide power to each accessory along the daisy chain, and can also provide power to the host device through the daisy chain of accessories. In some embodiments, an accessory may include a power path in the accessory that provides a power connection between an upstream device and a downstream device. The accessory may include hardware and/or software operable to influence the power path between the upstream device and the downstream device.

The power source can also be used to charge a host device. An accessory acting as a charging source (e.g., a charger such as a power adapter, a charging station, a charger block, a power brick, etc.) can be connected to the power source to convert the electrical power from the power source into a suitable form for powering and/or charging the host device and/or accessories. For example, the charging source may have a AC-to-DC convert to convert alternating current (AC) into direct current (DC) that can be used by the host device and/or accessories. In some embodiments, the charging source may be included as part of another accessory.

According to some embodiments of the present invention, an accessory coupled between a host device and a charging source can be authenticated by the charging source to enable a power path from the charging source to the accessory. Upon the charging source authenticating the accessory and enabling a power path to supply power to the accessory, the accessory can proceed to authenticate the host device. In one embodiment, upon detecting an input power signal from the charging source, the accessory can supply a limited current to the host device to enable the host device to send identification (ID) information to the accessory. The accessory can authenticate the host device based on the ID information, and in response, enable a power path between the charging source and the host device to supply a charging current to charge the host device. In some embodiments, the power path may pass through the accessory. The charging current is sufficient to charge a battery of the host device according to the specification of the battery of the host device.

In a particular embodiment, the battery of the host device may be dead (i.e. the battery is completely drained, or the battery is drained to the extent that the circuitry of the host device responsible for sending ID information cannot properly operate when using the battery as a power source). The limited current supplied from the accessory to the host device can provide sufficient power to enable circuitry in the host device responsible for sending ID information to send the ID information to the accessory. Thus, a host device with a dead battery can still be authenticated according to embodiments of the invention.

In some embodiments, the ID information from the host device may include information, such as a device identifier that identifies the host device. The ID information may also include an indicator that identifies a charge level of the battery of the host device. The charging source may use the charge level indicator to determine the amount of current to be provided to the host device. The host device may send the charge level indicator several times during the charging process to periodically inform the charging source about the charge level of the battery. The charging source may adjust the output current based on this information. For example, the charging source may provide maximum current initially and as the host device battery charges above a certain level, e.g., 90%, the charging source may adjust the current to a lower value to provide a "trickle charge."

In other embodiments, the ID information may include a charge current indicator that represents the amount of charging current requested by the host device. The charge current indicator can also be used by the accessory to determine the amount of charging current to provide to the host device. As the battery of the host device charges, the host device can send a subsequent charge current indicator to the accessory to change the amount of charging current being provided to the host device. The subsequent charge current indicator can be sent by the host device automatically, or the accessory can poll the host device periodically for the subsequent charge current indicator.

In other embodiments, multiple host devices can be coupled to a single charge source via one or more accessories. For example, two or more host devices can be connected through an accessory to a charging source. The accessory can distribute a charging current, received from the charging source, to each of the two host devices such that the charging current provided is based on the charge current indicator received from each host device. In some embodiments, if one host device charges up faster than the other host device, the host devices can send respective subsequent charge current indicators to the accessory such that the accessory can adjust the charging current provided to each host device based on the subsequent charge current indicators.

In other embodiments, an accessory can be coupled between an upstream device towards the direction of a power source and a downstream device towards the direction of a host device. The upstream device may be another accessory, or may be a charging source. The downstream device may be another accessory, or may be a host device. The accessory can be authenticated by the upstream device and can authenticate the downstream device in a similar manner as described above to enable a power path through the accessory. An example of such an embodiment will be described in more details with reference to FIG. 2 below.

Turning now to the figures, FIG. 1 illustrates a system 100 according to an embodiment of the present invention. In this embodiment, system 100 includes host devices 110 and 120, accessories 150 and 160, and a charging source 180. Host devices 110 and 120 are coupled to accessory 150 through cables 132 and 134, respectively. Accessory 150 is coupled to accessory 160 through cable 136. Accessory 160 is coupled to charging source 180, which can be plugged into power source 190 to provide power to charge host devices 110 and 120. In system 100, the upstream direction is the direction towards the power source 190, and the downstream direction is the direction towards host devices 110 and 120. It should be understood that the number of host devices and the number of accessories shown in FIG. 1 are meant to be exemplary, and that other systems according to other embodiments may have a different number of accessories and/or different number of host devices.

Host devices 110 and 120 may be any suitable electronic device that can perform the functionality discussed herein, and may include one or more hardware and or software components that can perform such functionality. For example, host device 110 can be a tablet as shown, or be another type of portable computing device (PCD) such as any of the PCD described above. Host device 120 can be a mobile phone as shown, or be another type of portable computing device (PCD) such as any of the PCD described above.

Each of host devices 110 or 120 may include any suitable components typically found in such electronic devices necessary to perform the operations discussed herein. For example, host device 110 may include a user interface 115 (e.g., a touchscreen) that may be operable to display information to the user or receive inputs from the user, and one or more buttons 118 for controlling the operation of host device 110 via a user input. Host device 110 may also include a connector 119 such as a plug connector or a receptacle connector for mechanically and electrically coupling host device 110 to other electronic components such as accessory 150, where connector 119 may include one or more pins or conductive contacts for establishing electrical and/or optical communication with corresponding pins or contacts of a connector coupled to connector 119. Furthermore, host device 110 may include other suitable components typically found in such systems for performing the operations discussed herein, such as a processor (not shown), a tangible non-transitory computer readable storage medium (not shown), and the like, all operably coupled to one another such that the processor may execute instructions stored on the computer readable storage medium so as to cause host device 110 to perform one or more of the operations discussed herein.

Host device 120 may include a user interface 125 that can display information to the user or receive inputs from the user (e.g., a touchscreen), a speaker 124 for providing an audio output to a user, a microphone for receiving audio inputs from a user, one or more buttons 128 for controlling the operation of host device 120 via a user input, a connector 129 such as a plug connector or a receptacle connector for mechanically and electrically coupling host device 220 to other electronic components such as accessory 150, where connector 129 may include one or more pins or conductive contacts for establishing electrical and/or optical communication with corresponding pins or contacts of a connector coupled to connector 129. Host device 120 may also include other suitable components typically found in such systems for performing the operations discussed herein, such as a processor (not shown), a tangible non-transitory computer readable storage medium (not shown), and the like, all operably coupled to one another such that the processor may execute instructions stored on the computer readable storage medium so as to cause host device 120 to perform one or more of the operations discussed herein.

Accessories 150 and 160 may be any suitable electronic device that can perform the functionality discussed herein, and may include one or more hardware and or software components that can perform such functionality. Accessory 150 can be a hub as shown, or be another type of accessory, such as any of the accessories describe above or a combination thereof. Accessory 160 can be a combination alarm clock/radio that includes speakers 162 and a clock 163 as shown, or be another type of accessory such as any of the accessories describe above or a combination thereof.

Each of accessories 150 or 160 may include any suitable components typically found in such electronic devices necessary to perform the operations discussed herein. For example, accessory 150 may include connectors 159A, 159B, and 159C such as a plug connector or a receptacle connector for mechanically and electrically coupling accessory 150 to other electronic components such as accessory 160 and host devices 210 and 220, where each of connectors 159A, 159B, and 159C may include one or more pins or conductive contacts for establishing electrical and/or optical communication with corresponding pins or contacts of a connector coupled to connector 159A, 159B, or 159C. Accessory 150 may also include other suitable components typically found in such systems for performing the operations discussed herein, such as a processor (not shown), a tangible non-transitory computer readable storage medium (not shown), and the like, all operably coupled to one another such that the processor may execute instructions stored on the computer readable storage medium so as to cause accessory 150 to perform one or more of the operations discussed herein.

Accessory 160 may include connectors 169A and 169B, such as a plug connector or a receptacle connector for mechanically and electrically coupling accessory 160 to other electronic components such as accessory 150 and a charging source 180, where each of connectors 169A and 169B may include one or more pins or conductive contacts for establishing electrical and/or optical communication with corresponding pins or contacts of a connector coupled to connector 169A or 169B. Accessory 160 may also include other suitable components typically found in such systems for performing the operations discussed herein, such as a processor (not shown), a tangible non-transitory computer readable storage medium (not shown), and the like, all operably coupled to one another such that the processor may execute instructions stored on the computer readable storage medium so as to cause accessory 160 to perform one or more of the operations discussed herein.

It should be noted that in some embodiments, each of cables 132, 134, or 136 may also be an accessory. Each of cables 132, 134, or 136 may include any suitable components typically found in such electronic devices necessary to perform the operations discussed herein. For example, cable 132 may include connector 132A that is compatible with connector 119 such that the two connectors 132A and 119 can mate to provide an electrical, mechanical, or optical connection between cable 132 and host device 110. Cable 132 may include connector 132B that is compatible with connector 159A such that the two connectors 132B and 159A can mate to provide an electrical, mechanical, or optical connection between cable 132 and accessory 150. Cable 134 may include connector 134A that is compatible with connector 129 such that the two connectors 134A and 129 can mate to provide an electrical, mechanical, or optical connection between cable 134 and host device 120. Cable 134 may include connector 134B that is compatible with connector 159B such that the two connectors 134B and 159B can mate to provide an electrical, mechanical, or optical connection between cable 134 and accessory 150. Cable 136 may include connector 136A that is compatible with connector 159C such that the two connectors 136A and 159C can mate to provide an electrical, mechanical, or optical connection between cable 136 and accessory 150. Cable 136 may include connector 136B that is compatible with connector 169A such that the two connectors 136B and 169A can mate to provide an electrical, mechanical, or optical connection between cable 136 and accessory 160.

Figure 2:
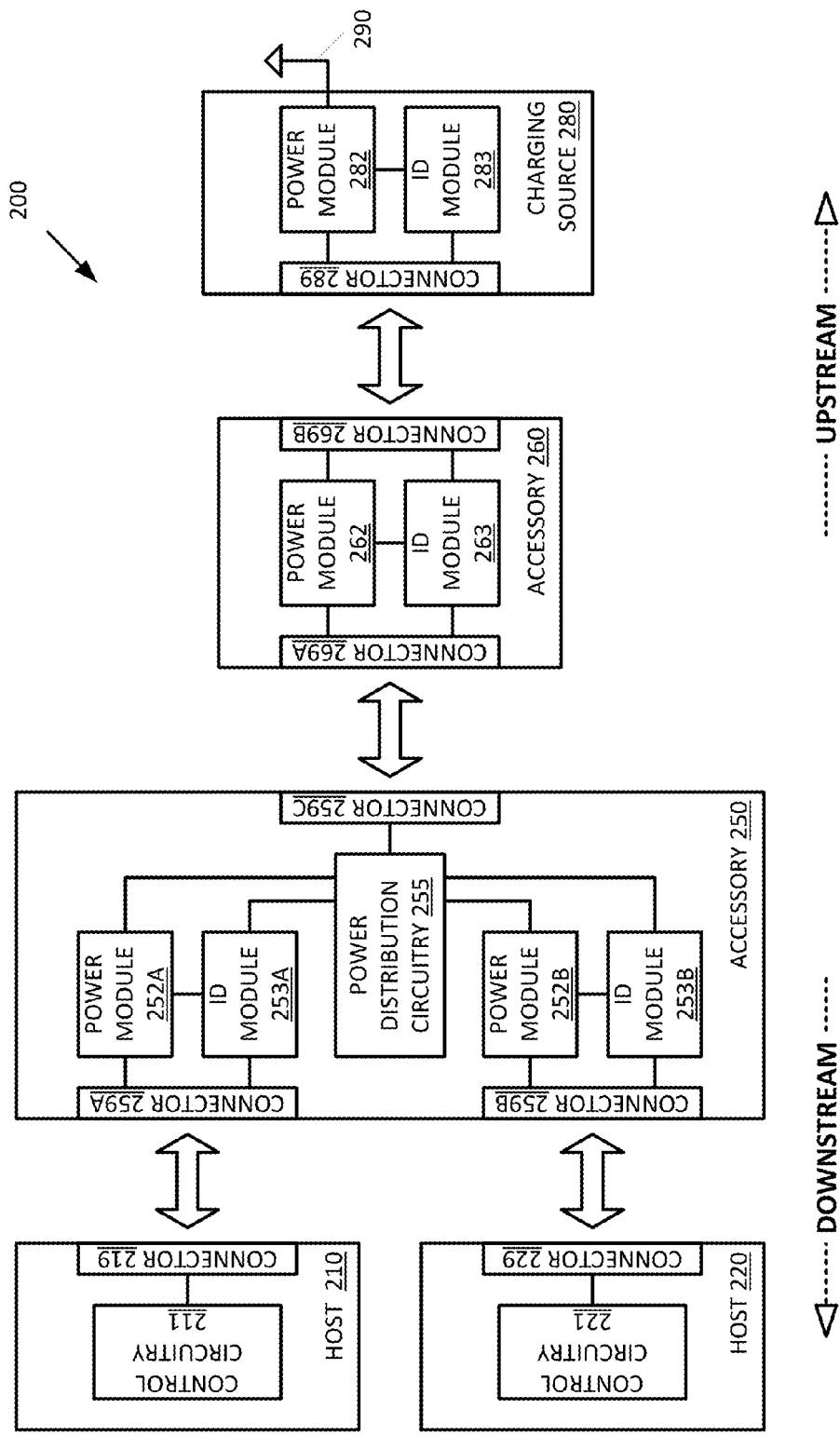
FIG. 2 illustrates a block diagram of a system with multiple accessories coupled to host devices according to one embodiment of the present invention.

Charging source 180 may be a charger block as shown, a charging station, a power adapter, a power brick, or any type of device that can source power, voltage, and/or current from a power source 190. Power source 190 can be an electrical outlet as shown, or an external battery, an AC/DC converter, a power supply, etc. In FIG. 2, charging source 180 is shown as being external to accessory 160. Alternatively, charging source 180 can be internal to accessory 160.

Charging source 180 may include any suitable components typically found in such electronic devices necessary to perform the operations discussed herein. For example, charging source 180 may include connector 189, such as a plug connector or a receptacle connector for mechanically and electrically coupling charging source 180 to other electronic components such as accessory 160, where connector 189 may include one or more pins or conductive contacts for establishing electrical and/or optical communication with corresponding pins or contacts of a connector coupled to connector 189. Charging source 180 may also include other suitable components typically found in such systems for performing the operations discussed herein, such as a processor (not shown), a tangible non-transitory computer readable storage medium (not shown), and the like, all operably coupled to one another such that the processor may execute instructions stored on the computer readable storage medium so as to cause charging source 180 to perform one or more of the operations discussed herein.

FIG. 2 illustrates a block diagram of a system 200 according to one embodiment of the present invention. An accessory (e.g., accessories 250 and 260) may include one or more power modules (e.g., power modules 252A, 252B, and 262) and one or more identification (ID) modules (e.g., ID modules 253A, 253B, and 263). An accessory may be coupled between an upstream device and a downstream device. The upstream device may be a charging source 280 or may be another accessory that is coupled towards the direction of a power source 290. The downstream device may be a host device 220 or may be another accessory that is coupled towards the direction of the host device. The power module of an accessory can be used to control a power path between the upstream device and the downstream device through the accessory. The ID module can be used to authenticate the accessory to the upstream device and can be used to authenticate a downstream device.

In FIG. 2, charging source 280 may include a power module 282, an ID module 283, and a connector 289 coupled to power module 282 and ID module 283. Charging source 280 may also include an AC/DC converter (not shown) that can convert an AC current from power source 290 into a DC current that can be provided on a power pin of connector 289.

In one embodiment, the power module 282 may include power control circuitry that can control a power path between a power source 290 and connector 289. In other words, power module 282 can control a power path between devices, e.g., accessory 260, that may be mechanically, electrically, and/or optically coupled to connector 289. Power module 282 may control the power path between power source 290 and accessory 260 in a number of ways. For example, power module 282 can selectively alter a characteristic of the power path, such as an electrical impedance, a voltage capacity, a current capacity, and the like. Additionally or alternatively, power module 282 may impose power limits, voltage limits, and/or current limits on power, voltage, and/or current, respectively, supplied to accessory 260 through a power pin of connector 289. In some embodiments, power module 282 may impose limits on amplitude, frequency, phase, and/or other characteristics of a signal, such as an electrical signal and/or an optical signal, communicated to accessory 260 through a data pin of connector 289.

According to one embodiment of the present invention, ID module 283 can authenticate accessory 260 that is coupled to the charging source 280 through connector 289, and influence power module 282 to control the power path between power source 290 and connector 289. For example, ID module 283 may send an ID request to accessory 260, and receive an ID response from accessory 260. ID module 283 may authenticate accessory 260 if the ID information in the ID response received from accessory 260 matches a set of known or compatible devices. ID module 283 may then send a signal to power module 282 to enable the power path between power source 290 and connector 289 such that a charging current can be provided to accessory 260. In some embodiments, in a default state, power module 282 presents a high resistance path to the incoming voltage from power source 290. This results in the power pin of connector 289 having low to no available current, and thus charging source 280 is unable to provide sufficient power to the downstream accessory, e.g., accessory 260.

According to some embodiments, accessory 260 may include a power module 262, an ID module 263, and connectors 269A and 269B coupled to power module 262 and ID module 263. Connector 269B is compatible with connector 289 such that the two connectors 269B and 289 can mate to provide an electrical, mechanical, or optical connection between charging source 280 and accessory 260.

In one embodiment, power module 262 may include power control circuitry that can control a power path between connector 269B and connector 269A. In other words, the power module 262 can control a power path between an upstream device that may be mechanically, electrically, and/or optically coupled to connector 269B, e.g., charging source 280, and a downstream device that may be mechanically, electrically, and/or optically coupled to connector 269A, e.g., accessory 250. Power module 262 may control the power path between charging source 280 and accessory 250 in any one or more of a number of ways. For example, power module 262 may can selectively alter a characteristic of the power path, such as an electrical impedance, a voltage capacity, a current capacity, and the like of the power path. Additionally or alternatively, power module 262 may impose power limits, voltage limits, and/or current limits on power, voltage, and/or current, respectively, supplied to accessory 250 through a power pin of connector 269A. In some embodiments, power module 262 may impose limits on amplitude, frequency, phase, and/or other characteristics of a signal, such as an electrical signal and/or an optical signal, communicated to accessory 250 through a data pin of connector 269A.

According to one embodiment, ID module 263 may can send ID information identifying accessory 260 to charging source 280 to authenticate accessory 260. ID module 263 may also be operable to authenticate a downstream device, e.g., accessory 250, that is coupled to accessory 260 through connector 269A. For example, ID module 263 may send an ID request to accessory 250, and receive an ID response containing ID information identifying accessory 250. ID module 263 may authenticate accessory 250 if the ID information received from accessory 250 matches a set of known or compatible devices. ID module 263 may then send a signal to the power module 262 to enable the power path between connector 269A and connector 269B such that a charging current can be provided to accessory 250.

According to some embodiments, accessory 250 may connect multiple host devices such as host device 210 and host device 220 to accessory 260. Accessory 250 may include a connector 259C that is compatible with connector 269A such that connector 259C and connector 269A can mate to provide an electrical, mechanical, and/or optical connection between accessory 260 and accessory 250. Accessory 250 may include a connector for each host device that accessory 250 can connect to, for example, connector 259A for host device 210 and connector 259B for host device 220. Accessory 250 may also include one power module and one ID module per host device that accessory 250 can connect to, for example power module 252A and ID module 253A for host device 210, and power module 252B and ID module 253B for host device 220. In other embodiments, the functionalities of power modules 252A and 252B can be combined into a single power module, and the functionalities of ID module 253A and 253B can be combined into a single ID module. Accessory 250 may also include power distribution circuitry 255 that can distribute a current received on connector 259C into a charging current provided to connector 259A for host device 210, and a charging current provided to connector 259B for host device 220. In some embodiments, each of the power modules and the ID modules of accessories 250, 260, power source 280, and host devices 210, 220 may be implemented as single integrated circuits. In other embodiments, a combined power and ID module can be implemented as a single integrated chip in each of the devices.

According to some embodiments, power module 252A can control a power path between accessory 260 and host device 210, and power module 252B can control a power path between accessory 260 and host device 220. The functionality and operation of power modules 252A and 252B are similar to the functionality and operation of power module 262 described above, and hence need not be repeated here. In some embodiments, ID module 253A can authenticate host device 210, and ID module 253B can authenticate host device 220. The functionality and operation of ID modules 253A and 253B are similar to the functionality and operation of ID module 263 described above, and hence need not be repeated here. In addition, as will be described below, according to some embodiments, power distribution circuitry 255 can distribute the current received on connector 259C as a charging current to host device 210 through power module 252A and a charging current to host device 220 through power module 252B. The amount of charging current provided to host devices 210 and 220 can be based on a charge current indicator from each host device. In some embodiments, power distribution circuitry 255 can also adjust the amount of charging current provided to host devices 210 and 220 based on charge current indicators periodically received from each host device.

Still referring to FIG. 2, the operations of charging host devices 210 and 220 through accessories 250 and 260 will now be described. It should be understood that the principles and operations described herein are applicable to other systems that may have a different topology or include a different number of accessories and/or a different number of host devices. When charging source 280 is first plugged into power source 290, the power module 282 of the charging source 280 is operated in a current limiting mode, that is the power path between power source 290 and connector 289 is in a disabled state as described above. In this current limiting mode, power module 282 provides a limited current to connector 289. The limited current may be, for example, 20 milliamps (mA), 25 mA, 10 mA, or 5 mA. The small amount of current provided by the limited current is insufficient to damage most types of accessory or host device, even an accessory or a host device that may be incompatible with the charging source 280. The limited current enables accessory 260 to send identification (ID) information to the charging source 280 to identify accessory 260. Charging source 280 receives the ID information and can determine if accessory 260 is compatible with the charging source 280. Alternatively, the limited current may enable accessory 260 to send an ID request to charging source 280, and to authenticate charging source 280 based on ID information identifying charging source 280 received from charging source 280 in response to the ID request. In some embodiments, the limited current may be insufficient to power other circuitry in accessory 260 besides ID module 263. This may not allow accessory 260 to operate in a normal mode of operation or to be put into an active state. For example, the limited current may provide sufficient power to ID module 263 of accessory 260 to send or receive ID information, but may be insufficient to turn on speakers 262 of accessory 260.

In one embodiment, ID module 283 of charging source 280 may send an ID request on a data pin of connector 289 to accessory 260. The ID request may ask accessory 260 (i.e. the downstream device) to send identification information for the accessory. In some embodiments, the ID request may be sent by charging source 280 in response to detecting an input power signal from the power source 290. In response to the ID request, accessory 260 may send back an ID response that includes the ID information identifying accessory 260. The ID module 283 may authenticate accessory 260 if the ID information received from accessory 260 is recognized as a known or compatible accessory. If accessory 260 fails to respond to the ID request or if the ID information received from accessory 260 indicates an unknown or incompatible device, power module 282 may maintain the power path in a disabled state (i.e. the power module remains in current limiting mode).

If accessory 260 is authenticated by ID module 283, ID module 283 may send a signal to power module 282 to put power module 282 in a bypass mode that enables the power path between power source 290 and connector 289 such that a charging current can be provided to the accessory 260. In this bypass mode of operation, the charging current provided to the accessory 260 through connector 289 may be 5 amps (A), 3 A, 2 A, 1 A, 800 milliamps (mA), 500 mA, 200 mA, or 100 mA. In some embodiments, the charging current may be 10 times or 100 times the limited current. In some embodiments, the charging current may provide sufficient power to enable accessory 260 to operate in a normal mode of operation or to be put into an active state. For example, the charging current provided to accessory 260 may be sufficient to turn on the speakers of accessory 260.

In other embodiments, ID module 283 of charging source 280 may not be required to send an ID request on a data pin of connector 289. Instead, the limited current that is provided to accessory 260 may serve as the ID request itself. In other words, when accessory 260 detects the limited current from the charging source 280, ID module 263 of accessory 260 may interpret this as an ID request and send ID information to charging source 280 in response to detecting the limited current.

In some embodiments, the ID information sent from ID module 263 of accessory 260 may include a charge current indicator. The charge current indicator may be used by charging source 280 to determine the amount of charging current to provide to accessory 260. For example, in one embodiment, the charge current indicator may be a value identifying a charge level of a battery of accessory 260, e.g., 50%, 30%, etc., if accessory 260 has such a battery. Charging source 280 may then provide an amount of charging current based on the charge level of the battery of accessory 260. In some embodiments, the value identifying the charge level may be represented in form of a percentage value such as between 0% and 100%. In other embodiments, the value may be represented as a relative level such as low, med, and full. For example, if the charge level of the battery of accessory 260 is low (or e.g., below 20%), charging source 280 may provide to accessory 260 a maximum amount of charging current allowable for accessory 260 based on the battery and/or accessory specification of accessory 260. If the charge level of the battery of accessory 260 is high (or e.g., about 90%), charging source 280 may provide a small amount of charging current to accessory 260.

In another embodiment, the charge current indicator may include a value representing the amount of current being requested by accessory 260. In one embodiment, accessory 260 may request a predetermined nominal amount of current, e.g., 2 Amps (A). In another embodiment, accessory 260 may request at least the amount of current required to operate accessory 260 in a normal mode of operation, e.g., 5 A, i.e. to turn on accessory 260 and to put accessory 260 into an active state. Charging source 280 may use the charge current indicator to provide a charging current to accessory 260 corresponding to the amount of current being requested by accessory 260. In another embodiment, charging source 280 may provide a different amount of charging current to accessory 260 than the amount of current being requested by accessory 260, for example, if charging source 280 cannot provide the amount of current being requested by accessory 260.

After authenticating accessory 260, charging source 280 may enable the power path from power source 290 to accessory 260. Thus, it is not necessary to first authenticate host device 210 or host device 220 before power is provided to accessory 260. With accessory 260 powered, accessory 260 may then provide an adequate limited current to accessory 250 to enable accessory 250 to be authenticated by accessory 260, e.g., using the techniques described above.

Initially, power module 262 of accessory 260 is operated in a current limiting mode when power module 262 first detects an input power signal provided on connector 269B by the charging source 280. The power signal can be, for example, the charging current provided by charging source 280. In this current limiting mode, the power path between connector 269A and connector 269B is in a disabled state, but power module 262 still provides a limited current to connector 269A. The limited current may be, for example, 20 milliamps (mA), 25 mA, 10 mA, or 5 mA. The small amount of current provided by the limited current is insufficient to damage most types of accessory or host device, even an accessory or a host device that may be incompatible with accessory 260 and/or charging source 280. The limited current enables a downstream device that is connected to connector 269A, such as accessory 250, to send identification (ID) information identifying the downstream device to accessory 260. ID module 263 of the accessory 260 can then determine if the downstream device is compatible with accessory 260 and/or the charging source 280 and authenticate the downstream device. In some embodiments, the limited current may be insufficient to power other circuitry besides ID module 253A or 253B in accessory 250. For example, the limited current may provide sufficient power to ID module 253A or ID module 253B of accessory 250 to send ID information identifying the accessory 250 to accessory 260, but may be insufficient to turn on other circuitry of accessory 250. It should be noted that in accessory 250, according to one embodiment, either ID module 253A or ID module 253B can be configured as a master ID module that is responsible for sending ID information identifying accessory 250.

In one embodiment, ID module 263 of accessory 260 may send an ID request on a data pin of connector 269A to request ID information from accessory 250 (i.e. the downstream device) in response to detecting the input power signal from charging source 280 (i.e. the upstream device). In response to the ID request, accessory 250 may send back an ID response that includes ID information identifying accessory 250. ID module 263 may authenticate accessory 250 if the ID information received from accessory 250 is recognized as a known or compatible accessory. If accessory 250 fails to respond to the ID request or if the ID information received from accessory 250 indicates an unknown or incompatible device, power module 262 may maintain the power path between connector 269A and connector 269B in a disabled state (i.e. the power module 262 remains in a current limiting mode).

If the accessory 250 is authenticated by ID module 263 of accessory 260, ID module 263 may then send a signal to the power module 262 to put the power module 262 in a bypass mode that enables the power path between connector 269A and connector 269B such that a charging current can be provided to the accessory 250. In this bypass mode of operation, the charging current provided to the accessory 250 through connector 269A may be 5 Amps (A), 3 A, 2 A, 1 A, 800 milliamps (mA), 500 mA, 200 mA, or 100 mA. In some embodiments, the charging current may be at least 10 times or 100 times the limited current. In some embodiments, the charging current may provide sufficient power to enable accessory 250 to operate in a normal mode of operation. For example, the charging current provided to accessory 250 may be sufficient to put accessory 250 into an active state.

In other embodiments, ID module 263 of accessory 260 may not be required to send an ID request on a data pin of connector 269A to request ID information from accessory 250. Instead, the limited current that is provided to accessory 250 may serve as the ID request itself. In other words, when accessory 250 detects the limited current from accessory 260, the ID module 253A or ID module 253B of accessory 250 would interpret this as an ID request and send ID information to accessory 260 in response to detecting the limited current.

In some embodiments, the ID information sent from the ID module 253A or ID module 253B of accessory 250 may include a charge current indicator that is used by accessory 260 to determine the amount of charging current to provide to accessory 250. For example, in one embodiment, the charge current indicator may be a value identifying a charge level of a battery of accessory 250, e.g., 50%, 30%, etc., if accessory 250 has such a battery. Accessory 260 may then provide an amount of charging current based on the charge level of the battery of accessory 250. In some embodiments, the value identifying the charge level may be represented in form of a percentage value such as between 0% and 100%. In other embodiments, the value may be represented as a relative level such as low, med, and full. For example, if the charge level of the battery of accessory 250 is low (or e.g., below 20%), accessory 260 may provide to accessory 250 a maximum amount of charging current allowable for accessory 250 based on the battery and/or accessory specification of accessory 250. If the charge level of the battery of accessory 250 is high (or e.g., about 90%), accessory 260 may provide a small amount of charging current to accessory 250.

In another embodiment, the charge current indicator may include a value representing the amount of current being requested by accessory 250. In one embodiment, accessory 250 may request a predetermined nominal amount of current, e.g., 2 Amps (A). In another embodiment, accessory 250 may request at least the amount of current required to operate accessory 250 in a normal mode of operation, e.g., 5 A, i.e. to turn on accessory 250 and to put accessory 250 into an active state. Accessory 260 may use the charge current indicator to provide a charging current to accessory 250 corresponding to the amount of current being requested by accessory 250. In another embodiment, accessory 260 may provide a different amount of charging current to accessory 250 than the amount of current being requested by accessory 250, for example, if accessory 260 cannot provide the amount of current being requested by accessory 250.

In some embodiments, the amount of charging current provided to accessory 260 by charging source 280 that was previously requested by accessory 260 may be insufficient to compensate for the amount of current being requested by accessory 250. For example, accessory 260 may have requested 50 mA from charging source 280 when accessory 260 was first authenticated. At that time, accessory 260 was unaware of the amount of current that accessory 250 may request because accessory 250 has not yet been authenticated by accessory 260. In an exemplary embodiment, upon authenticating accessory 250, accessory 250 may request 200 mA from accessory 260. Thus, the 50 mA that is being provided to accessory 260 from charging source 280 may be insufficient to supply the 200 mA that is being requested by accessory 250. Accordingly, in some embodiments, accessory 260 may, in response to authenticating accessory 250, send a command that includes an updated charge current indicator to charging source 280 to request an updated amount of current. The updated charge current indicator may include a value representing at least the amount of current being requested by accessory 250. In other words, in the above example, accessory 260 may send an updated charge current indicator to charging source 280 that includes a value representing at least 200 mA. In other embodiments, the updated charge current indicator may include a value representing a sum of the amount of current being requested by accessory 250 and accessory 260. In other words, in the example above, the updated charge current indicator may include a value representing 250 mA.

Having authenticated accessory 250, accessory 260 may enable the power path from charging source 280 to accessory 250. Thus, it is not necessary to first authenticate host device 210 or host device 220 before providing power to accessory 250. With accessory 250 being powered, accessory 250 may then provide an adequate limited current to host devices 210 and 220 to enable the host devices 210 and 220 to be authenticated by accessory 250, even when the respective battery of host devices 210 and 220 are dead, and even when charging source 280 is coupled to host devices 210 and 220 through one or more accessories, for example, accessories 250 and 260.

Initially, power modules 252A and 252B of accessory 250 are in a current limiting mode when power modules 252A and 252B first detect an input power signal provided on connector 259C by accessory 260. The power signal can be, for example, the charging current provided by accessory 260. In this current limiting mode, the power path between connector 259A and connector 259C, and the power path between connector 259B and connector 259C are in a disabled state, but power modules 252A and 252B still provides a limited current to connector 259A and 259B, respectively. The limited current may be, for example, 20 mA, 25 mA, 10 mA, or 5 mA. The small amount of current provided by the limited current is insufficient to damage most types of accessory or host device, even an accessory or a host device that may be incompatible with accessory 250 or charging source 280. The limited current enables host device 210 that is connected to connector 259A and/or host device 220 that is connected to connector 259B to send identification (ID) information to accessory 250 to identify the respective host devices such that ID modules 253A and 253B of the accessory 250 can determine if the respective host devices are compatible with accessory 250 and/or charging source 280. In some embodiments, the limited current may be insufficient to provide power to the other circuitry in the host device to enable the host device to operate in a normal mode of operation. For example, the limited current may provide sufficient power to control circuitry 211 of host device 210 and/or control circuitry 221 of host device 220 to send ID information identifying the respective host device to accessory 250, but may be insufficient to power or turn on other circuitry (e.g., a display) of the respective host device to enable the host device to be in an active state.

The operations of authenticating and enabling a power path to host device 210 by accessory 250 will now be described with reference to power module 252A and ID module 253A. In one embodiment, ID module 253A of accessory 250 may send an ID request on a data pin of connector 259A to request ID information from host device 210 upon detecting the input power signal from accessory 260. In response to the ID request, control circuitry 211 of host device 210 may send back an ID response that includes ID information identifying host device 210. ID module 253A may authenticate host device 210 if the ID information received from host device 210 is recognized as a known or compatible host device. If host device 210 fails to respond to the ID request, or if the ID information received from host device 210 indicates an unknown or incompatible device, power module 252A may maintain the power path between connector 259A and connector 259C in a disabled state (i.e. power module 252A remains in a current limiting mode).

If host device 210 is authenticated by ID module 253A of accessory 250, ID module 253A may then send a signal to power module 252A to put power module 252A in a bypass mode that enables the power path between connector 259A and connector 259C such that a charging current can be provided to host device 210. In this bypass mode of operation, the charging current provided to the host device 210 through connector 259A may be 5 amps (A), 3 A, 2 A, 1 A, 800 milliamps (mA), 500 mA, 200 mA, or 100 mA, or the charging current may be at least 10 times or 100 times the limited current. In some embodiments, the charging current may provide sufficient power to enable host device 210 to operate in a normal mode of operation. For example, the charging current provided to host device 210 may be sufficient to put host device 210 into an active state.

In other embodiments, the ID module 253A of accessory 250 may not be required to send an ID request on a data pin of connector 259A to request ID information from the host device 210. Instead, the limited current that is provided to host device 210 may serve as the ID request itself. In other words, when host device 210 detects the limited current from the accessory 250, the control circuitry 211 of the host device 210 would interpret this as an ID request and send ID information to accessory 250 in response to detecting the limited current.

In some embodiments, the ID information sent from control circuitry 211 of host device 210 may include a charge current indicator that is used by accessory 250 to determine the amount of charging current to provide to host device 210. For example, in one embodiment, the charge current indicator may be a value identifying a charge level of a battery of host device 210, e.g., 50%, 30%, etc. Accessory 250 may then provide an amount of charging current based on the charge level of the battery of host device 210. In some embodiments, the value identifying the charge level may be represented in form of a percentage value such as between 0% and 100%. In other embodiments, the value may be represented as a relative level such as low, med, and full. For example, if the charge level of the battery of host device 210 is low (or e.g., below 20%), accessory 250 may provide to host device 210 a maximum amount of charging current allowable for host device 210 based on the battery and/or specification of host device 210. If the charge level of the battery of host device 210 is high (or e.g., about 90%), accessory 250 may provide a small amount of charging current to host device 210.

In another embodiment, the charge current indicator may include a value representing the amount of current being requested by host device 210. In another embodiment, the charge current indicator may include a value representing the amount of current being requested by host device 210. In one embodiment, host device 210 may request a predetermined nominal amount of current, e.g., 2 Amps (A). In another embodiment, host device 210 may request at least the amount of current required to operate host device 210 in a normal mode of operation, e.g., 5 A, i.e. to turn on host device 210 and to put host device 210 into an active state. Accessory 250 may use the charge current indicator to provide a charging current to host device 210 corresponding to the amount of current being requested by host device 210. In another embodiment, accessory 250 may provide a different amount of charging current to host device 210 than the amount of current being requested by host device 210, for example, if accessory 250 cannot provide the amount of current being requested by host device 210.

The operations of authenticating and enabling a power path to host device 220 with power module 252B and ID module 253B are similar to those described above, and hence need not be repeated here.

Upon authenticating host devices 210 and 220, accessory 250 may supply both a charging current to charge or operate host device 210 and a charging current to charge or operate host device 220. In one embodiment, the amount of current provided to accessory 250 by accessory 260 may be less than the total amount of charging current being requested by host devices 210 and 220. For example, accessory 250 may have requested 200 mA from accessory 260 when accessory 250 was first authenticated. At that time, accessory 250 was unaware of the amount of current that host devices 210 and 220 may request, because host devices 210 and 220 had not yet been authenticated. Upon authenticating host devices 210 and 220, host device 210 may request, for example, 2 Amps (A), while host device 220 may request, for example, 500 milliamps (mA). The 200 mA provided to accessory 250 is less than the total requested current of 2.5 A that is now being requested by host devices 210 and 220. Accordingly, in some embodiments, accessory 250 may, in response to authenticating host devices 210 and 220, send a command to accessory 260 that includes an updated charge current indicator to request an updated amount of charging current. Accessory 260 may propagate the updated charge current indicator to charging source 280 to request an updated amount of charging current.

In some embodiments, charging source 280 may be incapable of supplying the total amount of current request by both host devices 210 and 220. Accordingly, accessory 250 may request the maximum amount of current that charging source 280 can supply and distribute the current into respective charging currents for host devices 210 and 220. The charging current provided to each host device would be in the same proportion as the charge current indicator provided by each host device. For example, continuing with the example given above, host device 210 may request 2 Amps (A), and host device 220 may request 1 A. As an example, charging source 280 may be only capable of supply 600 mA. In such a scenario, the power distribution circuitry 255 of accessory 250 may take the 600 mA provided from charging source 280 and distribute 400 mA to host device 210 and 200 mA to host device 220. In other words, the charging current provided to each host device may have the same proportion as the amount of current requested by each host device as indicated by the respective charge current indicators.

Furthermore, as the battery of each host device charges, each host device may send a command with a subsequent charge current indicator to accessory 250 to request a change in the amount of charging current provided to the host device. For example, host device 210 or host device 220 may send a subsequent charge current indicator to adjust the charging current when the battery of the respective host device reaches 20%, 25%, 50%, 80%, 90% of full charge and when the battery is fully charged. Because the battery capacity of host device 210 may be different than the battery capacity of host device 220, each battery may charge up at a different rate. As a result, as accessory 250 receives the subsequent charge current indicator from each host device, the power distribution circuitry 255 adjusts and redistributes the amount of charging current provided to each host device accordingly. In some embodiments, accessory 250 may periodically send a command with an updated charge current indicator to accessory 260 to reduce or increase the amount charging current being provided to accessory 250 as the battery of respective host device charges up.

In some embodiments, instead of distributing the current from charging source 280 in a proportional manner as described above when charging source 280 is incapable of supplying the total amount of current request by both host devices 210 and 220, accessory 250 may provide a charging current to only one of the host devices 210 and 220. For example, suppose host device 210 requests 500 mA, and host device 220 also requests 500 mA. Charging source 280 may be only capable of supply 600 mA. Distributing the current in a proportional manner may result in 300 mA being provided to both host devices 210 and 220. However, if 300 mA is below the minimum current requirement for charging the battery of each host device according to the specification of the battery and/or host device, distributing the current in a proportional manner may result in a scenario where neither of the host device may charge. In such a scenario where distributing the current in a proportional manner may result in at least one of the host devices to not charge, power distribution circuitry 255 of accessory 250 may provide a charging current to only one of the host device (e.g., by disabling the power path to the other host devices). For example, power distribution circuitry 255 of accessory 250 may provide no current to host device 210, and a charging current of 500 mA to host device 220 such that the battery of host device 220 can charge. When the battery of host device 220 charges up to a certain level (e.g., 50%, 90%, etc.) or is fully charged, power distribution circuitry 255 of accessory 250 may switch from providing a charging current to host device 220 to providing a charging current to host device 210. In other words, in some embodiments, power distribution circuitry 255 of accessory 250 may provide a charging current to one host device at a time to charge the host devices in a serial manner.

Figure 3:
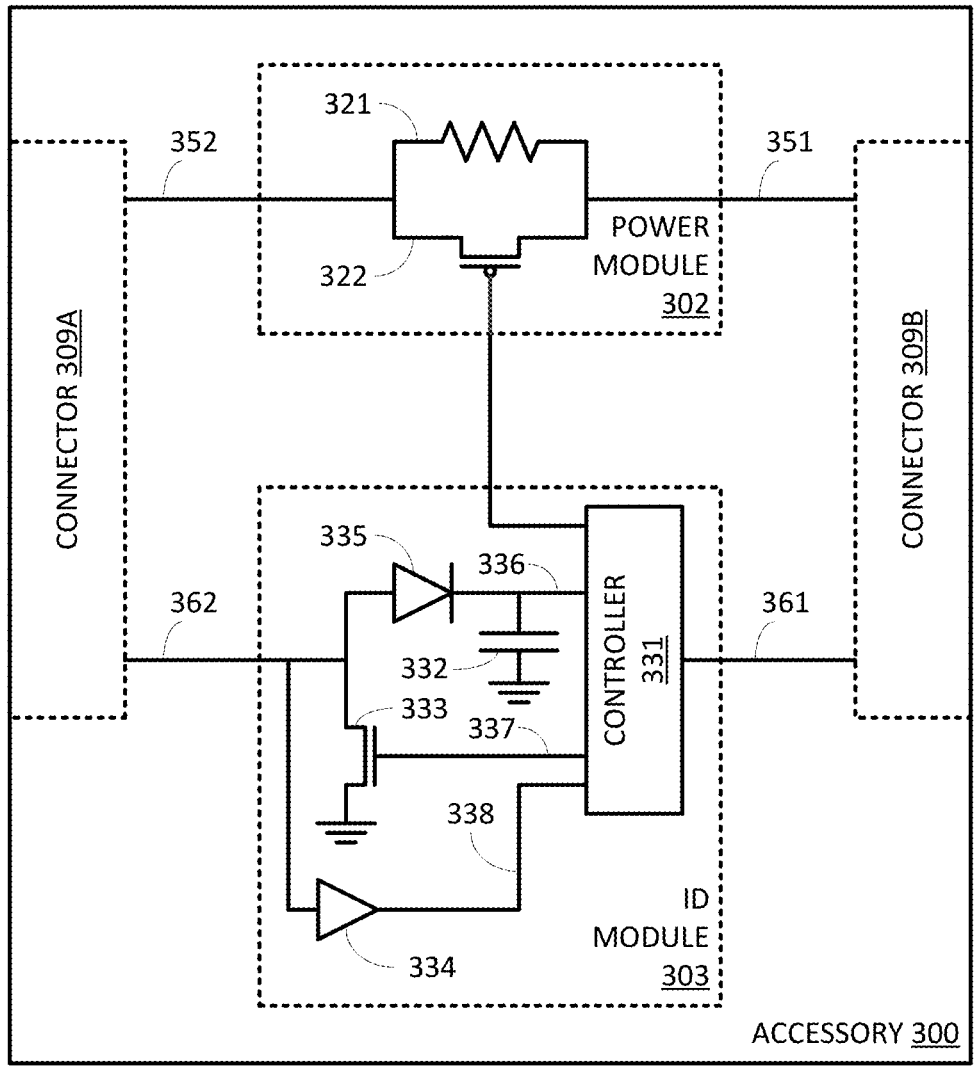
FIG. 3 illustrates a block diagram of an accessory that can be used as an intermediary accessory to connect to a host device according to one embodiment of the present invention.

FIG. 3 illustrates the circuitry of an accessory 300, which can be, for example, accessory 260, according to one embodiment. The accessory 300 includes a connector 309B for coupling to an upstream device such as charging source 280 of FIG. 2 and a connector 309A for coupling to a downstream device such as accessory 250 of FIG. 2. Accessory 300 includes a power module 302 with power control circuitry for controlling a power path (e.g., power path through line 351 and line 352) between connector 309A and connector 309B. Accessory 300 also includes ID module 303 that can send ID information identifying accessory 300 to an upstream device in order to receive power from the upstream device. Also, ID module 303 can receive ID information from a downstream device prior to enabling the power path between connector 309A and connector 309B.

ID module 303, which may be implemented at least partially in hardware or software as a processor (either single core or multi-core) or other type of logic (e.g., an ASIC), may be operable to receive power and data via connector 309B or connector 309A and respond to the received data. For example, ID module 303 may have stored therein ID information such as an accessory identifier, and may be operable to communicate the accessory identifier to an upstream device in response to receiving a request for the ID information. ID module 303 may also be operable to send instructions to power module 302 instructing power module 302 to alter an impedance of the power path between connector 309A and connector 309B and hence enable or disable the power path between lines 351 and 352.

Power module 302, which may be implemented at least partially in hardware or software as a processor (either single core or multi-core) or other type of logic, (e.g., an ASIC), may be operable to alter an impedance of the power path between connector 309A and connector 309B. This may be in response to an instruction from ID module 303 or, in some embodiments, in response to an instruction sent directly from a device coupled through connector 309A or connector 309B. There are various ways that power module 302 may alter the impedance of the power path, as further described herein.

Referring to FIG. 3, power module 302 according to this embodiment includes a resistive element 321 coupled in parallel with a switch 322. Resistive element 321 and switch 322 are arranged along or in-line with a power path between connector 309A and connector 309B. Resistive element 321 may provide any suitable resistance for measurably altering an impedance characteristic of accessory 300. For example, resistive element 321 may have a resistance of 1 Ohm, 2 Ohm, 3 Ohm, 100 Ohm, 200 Ohm, 300 Ohm, 1 kOhm, 2 kOhm, 3 kOhm, 1 MOhm, 2 MOhm, 3 MOhm, be in a range from 1 to 3 Ohm, 100 Ohm to 300 Ohm, 1 kOhm to 3 kOhm, 1 MOhm to 3 MOhm, or less than 1 Ohm or greater than 3 MOhm.

Resistive element 321 may be coupled to a power pin of connector 309B on one end and a power pin of connector 309A on the other end, such that resistive element 321 is disposed along a power path between connector 309A and connector 309B.

Switch 322 may be any suitable switching element that allows current provided from connector 309B to selectively bypass resistive element 321. For example, switch 322 may be a MOSFET, JFET, or other type of transistor or other semiconductor device that can switch electronic signals and power. Switch 322 is coupled in parallel to resistive element 321 and includes a first terminal (e.g., a source) coupled to one end of resistive element 321, a second terminal (e.g., a drain) coupled to second end of resistive element 321, and a third terminal (e.g., a gate) for controlling the operation of switch 322. In an OFF state, switch 322 has a resistance significantly higher than the resistance of resistive element 321. In an ON state, switch 322 has a resistance that is significantly lower than the resistance of resistive element 321.

As described above, power module 302 may operate to alter an impedance of a power path between connector 309A and connector 309B. In some embodiments, power module 302 may operate in different modes, e.g., a bypass mode and a current limiting mode. Such modes may be entered in response to instructions from ID module 303 and, in some embodiments, power module 302 may operate in some modes (e.g., the current limiting mode) by default.

In one embodiment, the bypass mode may result from switch 322 being in the ON state. As a result of the relatively low resistance of switch 322 as compared to resistive element 321, current provided from connector 309B may pass through the accessory 300 substantially unaltered. Power module 302 may also operate in a current limiting mode. While in the current limiting mode of operation, power module 302 may operate to limit an amount of current provided from connector 309B to connector 309A. In one embodiment, this may be achieved by placing switch 322 into the OFF state. As a result of the relatively high resistance of switch 322 as compared to resistive element 321, current provided from connector 309B may pass through resistive element 321. Since resistive element 321 has a resistance that is greater than a nominal amount such as 0 Ohm, the amount of current passing through to connector 309A available at the output end of resistive element 322 depends on the value of resistive element 321. Hence, when power module 302 is operated in the bypass mode, the incoming current received on connector 309B can be provided to connector 309A through switch 322. When power module 302 is operated in the current limiting mode, a limited current can be provided to connector 309A from connector 309B through resistive element 321.

In accordance with the embodiment depicted in FIG. 3, ID module 303 may include circuitry to facilitate single-wire open-drain communication. In some embodiments, the functionality provided by such circuitry may be performed by a processor (single core or multi-core), multiple processors or other suitable circuitry. In the embodiment described with reference to FIG. 3, the circuitry for providing the single-wire open-drain communication interface may include an internal power line 336, an internal transmit line 337, and an internal receive line 338, each coupled to a controller 331 and data pins 361 and 362.

In accordance with this embodiment, a single-wire open-drain communication interface may be used to allow an external device coupled to connector 309A (e.g., a downstream device) to communicate with accessory 300 on data pin 362, and an external device coupled to connector 309B (e.g., an upstream device) to communicate with accessory 300 on data pin 361. In such a case, an active or passive pull-up resistance (not shown) may be used to pull data pin 361 to a high state when neither accessory 300 nor an external device coupled to connector 309B communicate information over data pin 361. To communicate information between one another, an external device coupled to connector 309B and/or accessory 300 may pull data pin 361 low. Similarly, an active or passive pull-up resistance (not shown) may be used to pull data pin 362 to a high state when neither accessory 300 nor an external device coupled to connector 309A communicate information over data pin 362. To communicate information between one another, an external device coupled to connector 309A and/or accessory 300 may pull data pin 362 low.

Internal power line 336 may be used to power the ID module 303. Internal power line 336 may be coupled to one end of a capacitor 332 or other type of charge storage element, where the other end of capacitor 332 is coupled to ground. Internal power line 336 may be coupled to data pin 362 via a diode 335, which may be used to prevent capacitor 332 from discharging through data pin 362. In operation, a high voltage state at data pin 362 may cause capacitor 332 to charge and provide power to internal circuitry of accessory 300, e.g., controller 331. Similarly, a high voltage state at data pin 361 may cause controller 331 to provide a signal to charge capacitor 332. When information is communicated between an external device and accessory 300, by way of pulling down the voltage of data pin 361 or data pin 362, capacitor 332 may have enough stored charge to facilitate at least temporary operation of accessory 300. Accordingly, in some embodiments, power provided via internal power line 336 may be sufficient to fully power all components of accessory 300. In other embodiments, however, power provided via internal power line 336 may be sufficient to only power a subset of the components of accessory 300. For example, power provided via internal power line 336 may be sufficient to only power operation of ID module 303. In some embodiments, accessory 300 may receive additional or alternative power for operating one or more of its components via a power source other than the power provided via internal power line 336, such as via a power pin on connector 309A or connector 309B.

Returning to FIG. 3, internal transmit line 337 may be used to communicate information from accessory 300 to an external device, for example to send an ID request or to send ID information. Internal transmit line 337 may be coupled to data pin 362 via a transmission switch 333, and may be coupled to internal circuitry such as controller 331 that can communicate information to the external device via changes in voltage levels. Transmission switch 333 may be a MOSFET, JFET, or other type of transistor or other semiconductor device that can switch electronic signals and power. Transmission switch 333 may include multiple terminals, such as a gate coupled to internal transmit line 337, a source coupled to data pin 362 and, in some embodiments, to diode 335, and a drain coupled to ground. Controller 331 or other internal circuitry of accessory 300 can change a state of transmission switch 333, where changing a state of transmission switch 333 may cause a change in voltage at data pin 362. For example, by placing transmission switch 333 into an ON state, the voltage at data pin 362 may be pulled to ground or some other low voltage. By placing transmission switch 333 into an OFF state, the voltage at data pin 362 may return to a higher voltage than ground, e.g., 5V.

It should be recognized that in some embodiments, accessory 300 may also or alternatively transmit information to an external device via some other means other than internal transmit line 337. For example, accessory 300 may transmit information to an external device via a pin other than data pins 361 or 362. For another example, accessory 300 may transmit information wirelessly to the external device.

Internal receive line 338 may be used to receive information such as an ID request or ID information from an external device via data pins 361 or 362. Internal receive line 338 may be coupled to some internal circuitry such as controller 331 that can interpret changes in voltage levels provided at internal receive line 338, and may also be coupled to data pin 362 via an amplifier element 334 that can amplify the voltage received at data pin 362. In operation, controller 331 or other internal circuitry coupled to internal receive line 338 may be operable to receive and interpret information communicated to accessory 300 from an external device.

It should be recognized that in some embodiments, accessory 300 may also or alternatively receive information from an external device via some means other than internal receive line 338. For example, accessory 300 may receive information from an external device via a pin other than data pins 361 or 362. For another example, accessory 300 may receive information wirelessly from an external device.

While single-wire open-drain communication circuitry is disclosed in detail with reference to FIG. 3, it should be recognized that embodiments of the present invention are not limited to communication between accessory 300 and an external device (e.g., an upstream device or a downstream device) using such circuitry. Rather, accessory 300 may include any suitable circuitry for establishing communication with an external device over any suitable communication protocol. For example, accessory 300 may include suitable circuitry for establishing serial communication such as that defined by the RS-232 standard and/or that using a UART transceiver, parallel communication such as that defined by the IEEE-488 protocol, USB communication, PCI communication, etc.

Figure 4:
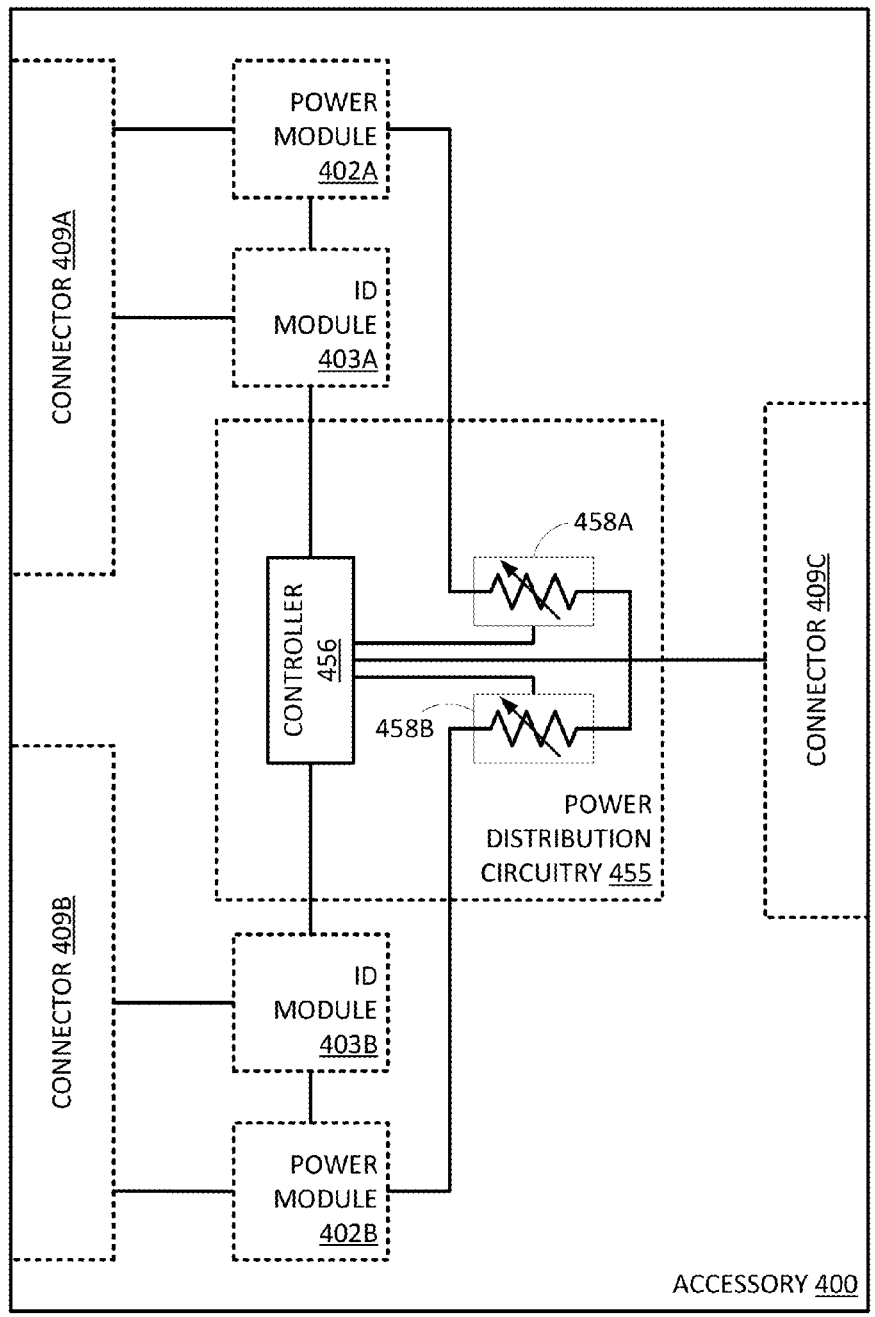
FIG. 4 illustrates a block diagram of an accessory that can be used as an intermediary accessory to connect to a host device according to a different embodiment of the present invention.

FIG. 4 illustrates an accessory 400 that includes power distribution circuitry 455 according to one embodiment. Accessory 400 can be implemented, e.g., as accessory 250 of FIG. 2. According to this embodiment, accessory 400 can provide a charging current to two downstream devices that may be coupled to connector 409A and connector 409B, respectively. In other embodiments, accessory 400 can provide a charging current to a different number of downstream devices. Accessory 400 may include a power module 402A that can control a power path between an upstream device coupled to connector 409C and a downstream device coupled to connector 409A, and an ID module 403A that can communicate with an upstream device coupled to connector 409C and a downstream device coupled to connector 409A. Accessory 400 may also include a power module 402B that can control a power path between an upstream device coupled to connector 409C and a downstream device coupled to connector 409B, and an ID module 403B that can communicate with an upstream device coupled to connector 409C and a downstream device coupled to connector 409B. In an alternative embodiment, there may be only one power module and one ID module, and the functionalities and operations of the two sets of modules are combined into one set of modules.

The operations of ID modules 403A and 403B are similar to those discussed above with reference to ID module 303 of FIG. 3, and the operations of power modules 402A and 402B are similar to those discussed above with reference to power module 302 of FIG. 3, and hence need not be repeated here.

Power distribution circuitry 455 includes a controller 456 and one or more current control circuits 458A and 458B which collectively function as current divider circuitry. Current control circuit 458A is placed in a power path between the upstream device that is connected to connector 409C and power module 402A. Current control circuit 458B is placed in a power path between the upstream device that is connected to connector 409C and power module 402B. In one embodiment, the current control circuits 458A and 458B may be impedance altering circuits as shown, where the impedance of the circuits can be adjusted to control the current passing through the current control circuits 458A and 458B. It should be understood that in alternative embodiments, other current dividing mechanism or control can be used by power distribution circuitry 455.

In one embodiment, upon connection of a downstream device, e.g., host device 210 or 220 of FIG. 2, to each of connectors 409A and 409B, the downstream devices can send their identification information and a charge current indicator to accessory 400. Accessory 400 can receive the charge current indicators, e.g., at ID modules 403A and 403B. Upon authenticating the downstream devices, ID modules 403A and 403B may send the received charge current indicators to the controller 456 of the power distribution circuitry 455. In one embodiment, controller 456 can sum up the charge current indicators to determine the total amount of charging current being requested by all downstream devices that are coupled to accessory 400 and determine the percentage of the total amount of charging current that each downstream device is requesting based on the charge current indicator provided by each of the downstream devices. Controller 456 can adjust the impedance of the current control circuits 458A and 458B such that the charging current provided to each of the downstream devices corresponds to the charging current requested by each downstream device.

For example, suppose controller 456 determines that the amount of current being requested by a downstream device coupled to connector 409A is 25% of the total amount of current being requested of accessory 400 from all host devices coupled to accessory 400, and that the amount of current being requested by a downstream device coupled to connector 409B is 75% of the total amount of current being requested of accessory 400 from all host devices coupled to accessory 400. In some embodiments, controller 456 may adjust the impedance of current control circuit 458A to be 75% of the total impedance of current control circuits 458A and 458B, and adjust the impedance of current control circuit 458B to be 25% of the total impedance of current control circuits 458A and 458B to distribute 25% of the current received on connector 409C to a downstream device coupled to connector 409A, and 75% of the current received on connector 409C to a downstream device coupled to connector 409B. In other embodiments, controller 456 may also take into account the input impedance of the downstream devices when adjusting the current control circuits 458A and 458B, because the input impedance of the downstream devices may affect the amount of current being distributed through the current divider circuitry (e.g., current control circuits 458A and 458B).

In some embodiments, controller 456 may determine that distributing the current received on connector 409C to both a downstream device coupled to connector 409A and a downstream device coupled to connector 409B may cause at least one of the downstream devices to not charge, for example, if the amount of current provided to the downstream device is below the minimum requirement for charging the battery of that downstream device. In such an embodiment, controller 456 may disable a power path between connector 409C and connector 409A to provide the current received on connector 409C to only the downstream device coupled to connector 409B, or alternatively disable a power path between connector 409C and connector 409B to provide the current received on connector 409C to only the downstream device coupled to connector 409A. This way, one of the downstream devices can be charged if the current received on connector 409C is insufficient to charge both downstream devices. When the one downstream device charges up, controller 456 may disable the power path to that downstream device and enable the power path to the other downstream device to charge the other downstream device. In other words, controller 456 may alternately enable and disable the power path to each downstream device to charge the downstream devices in a serial manner.

Figure 5:
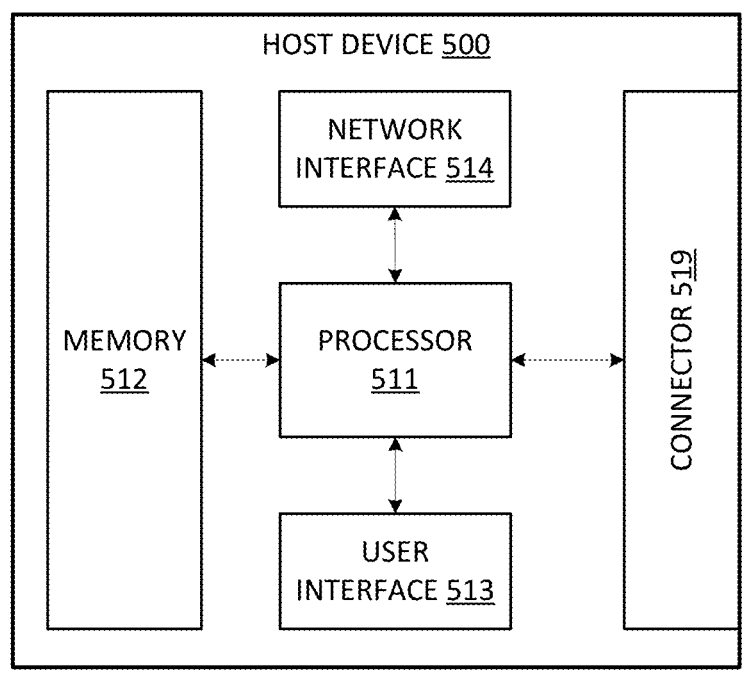
FIG. 5 illustrates a block diagram of a host device that can be used to connect to multiple accessories according to one embodiment of the present invention.

FIG. 5 illustrates a host device 500, which can be, for example, host device 210 or 220, according to one embodiment. Host device 500 can include processor 511, memory 512, user interface (UI) 513, network interface 514, and connector 519. Processor 511, which can be implemented as one or more integrated circuits (including, e.g., one or more microprocessors and/or microcontrollers and/or a multi-core processor), may control the operation of host device 500. For example, in response to user input signals provided by user interface 513, processor 511 can perform various tasks such as selecting and playing media assets that may be stored in memory 512, accessing various networks (e.g., a mobile telephone network, the Internet, local area network, or the like) to send and/or retrieve data using network interface 514, executing software residing in memory 512, and so on. Processor 511 can also manage communication and exchange data with accessories via connector 519.

Memory 512 may be implemented using disk, non-volatile memory such as flash memory, ROM, PROM, EPROM or other non-volatile storage medium, or a combination thereof. Memory 512 may also include random access memory (RAM). Memory 512 can store application programs that are executable by processor 511, system programs and other program code (not explicitly shown), and various data and/or information that can be used in managing communication with various accessories. In some embodiments, memory 512 can also store media assets such as audio, video, still images, or the like, that can be played by host device 500, along with metadata describing the media assets (e.g., asset name, artist, title, genre, etc.), playlists (lists of assets that can be played sequentially or in random order), and the like. Memory 512 can also store any other type of information such as information about a user's contacts (names, addresses, phone numbers, etc.); scheduled appointments and events; notes; and/or other personal information.

In some embodiments, the control circuitry in host device 500 responsible for sending ID information to an accessory coupled to connector 519 (e.g., control circuitry 211 and 221 in FIG. 2) may be implemented using a combination of processor 511 and memory 512. For example, the ID information identifying host device 500 may be stored in memory 512, and processor 511 can be configured to send the ID information on connector 519 in response to receiving an ID request. In other embodiments, the control circuitry (e.g., control circuitry 211 and 221 in FIG. 2) in host device 500 responsible for sending ID information to an accessory coupled to connector 519 may be implemented with circuitry similar to ID module 303 as described with reference to FIG. 3.

Network interface 514 can provide an interface to one or more communication networks. For example, network interface 514 can incorporate a radio frequency (RF) transceiver and suitable components for communicating via a mobile communication network such as a mobile telephone network. Additionally or instead, network interface 514 can incorporate a wireless connection to the Internet (e.g., a WiFi transceiver, 3G/4G transceiver or the like), to a personal area network (e.g., a Bluetooth network), or any other network. In still other embodiments, a wired network connection (e.g., Ethernet) may be provided. In some embodiments, the same hardware can be used to support connections to multiple networks; thus, network interface 514 can include analog to digital and/or digital to analog circuitry, baseband processing components (e.g., codecs, channel estimators, and the like), modulators, demodulators, oscillators, amplifiers, transmitters, receivers, transceivers, internal and/or external antennas, and so on. In some embodiments, some operations associated with network connectivity can be implemented entirely or in part as programs executed on processor 511 (e.g., encoding, decoding, and/or other processing in the digital domain), or a dedicated digital signal processor can be provided.

User interface 513 can include input controls such as a touch pad, touch screen, scroll wheel, click wheel, dial, button, keypad, microphone, etc., as well as output devices such as a display screen, indicator lights, speakers, headphone jacks, etc., together with supporting electronics (e.g., digital-to-analog or analog-to-digital converters, signal processors or the like). A user can operate the various input controls of user interface 513 to invoke the functionalities of host device 500 and can also view and/or hear output from host device 500 via user interface 513.

Figure 6:
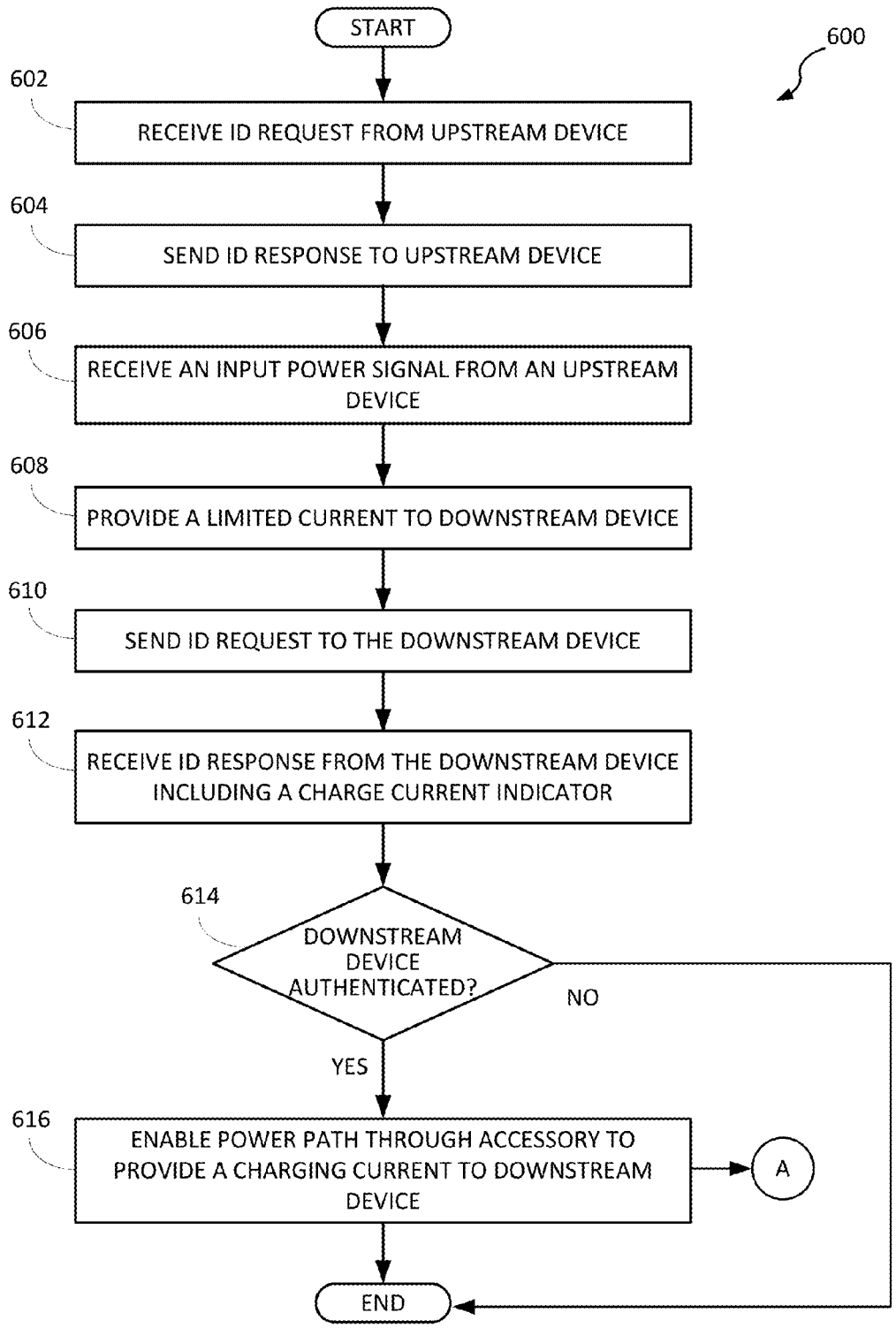
FIG. 6 illustrates a flow diagram of charging a host device through an intermediary accessory according to an embodiment of the present invention.

FIG. 6 illustrates a flow chart 600 for charging a host device through an accessory according to some embodiments. At block 602, the accessory may receive an ID request from an upstream device coupled to the accessory. The upstream device can be a charging source or another accessory. At block 604, in response to receiving the ID request from the upstream device, the accessory may sends an ID response to the upstream device. The ID response may include ID information identifying the accessory and may also include a charge current indicator. The upstream device may authenticate the accessory and provide a charging current to the accessory based on the charge current indicator in the ID response. At block 606, the accessory may receive an input power signal from the upstream device. In one embodiment, the input power signal may be the presence of a voltage or a current detected on a power pin of the accessory. In another embodiment, the input power signal may be a change in a voltage level or a current on a power pin of the accessory, for example, an increase from a nominal voltage to a supply voltage on an input power pin, or an increase from a limited current to the charging current being received on an input power pin.

Upon detecting the input power signal from the upstream device, at block 608, the accessory may provide a limited current to a downstream device. The downstream device can be a host device or another accessory. The limited current provided to the downstream device enables the downstream device to send identification (ID) information to the accessory. Thus, in some embodiments, even when if the battery of the downstream device is dead (i.e. the battery is completely drained, or the battery is drained to the extent that the circuitry of the downstream device responsible for sending the ID information cannot properly operate when using the battery as a power source), the downstream device can still be authenticated by the accessory.

At block 610, the accessory may send an identification (ID) request to the downstream device to request the downstream device to send ID information identifying the downstream device to the accessory. In one embodiment, the ID request can be sent as a command on a data pin. In an alternative embodiment, the limited current provided in block 608 can serve as the ID request.

At block 612, the accessory may receive an ID response that include ID information identifying the downstream device. The ID response may also include a charge current indicator from the downstream device. The charge current indicator can be used by the accessory to determine the amount of charging current to provide to the downstream device upon authenticating the downstream device. In one embodiment, the charge current indicator may represent a charge level of the battery of the downstream device. In a different embodiment, the charge current indicator may represent the amount of charging current requested by the downstream device.

At block 614, the accessory may determine if the downstream device is authenticated, that is, if the downstream device is a known or compatible device that can interoperate with the accessory or the upstream device. If the ID information in the ID response sent from the downstream device is recognized or known to the accessory, then the downstream device can be authenticated, and the process continues at block 616. If the downstream device fails to send ID information to the accessory, for example, after a predetermined period of time such as 2 second, 5, seconds, or 20 seconds, or after a time-out timer expires in the accessory, the downstream device may not be authenticated. Or if the downstream device sends ID information that is not recognized by the accessory or is otherwise determined to be an incompatible device, the downstream device may not be authenticated. In some embodiments, the accessory may send a predetermined number of ID request, for example 5 times, 10 times, or 20 times, in an attempt to request ID information from the downstream device (not shown). If a recognizable or compatible ID information is not received from the downstream device after the predetermined number of ID requests are sent, the process may terminate.

If the downstream device is authenticated at block 614, then at block 616, the accessory enables a power path between the upstream device and the downstream device to provide a charging current to the downstream device. The amount of charging current provided by the accessory may be dependent on the charge current indicator that the downstream device sent to the accessory. In one embodiment, if the current provided to the accessory by the upstream device is insufficient to meet the amount of charging current requested by the downstream device, the accessory may send a command that includes an updated charge current indicator to the upstream device to ask the upstream device to provide the appropriate amount of charging current such that the accessory can provide the amount of charging current requested by the downstream device.

In some embodiments, as the downstream device charges up, the downstream device may adjust the amount of charging current the downstream device requests by sending a subsequent charge current indicator to the accessory. In such embodiments, the charging process continues with flow chart 700 of FIG. 7.

Figure 7:
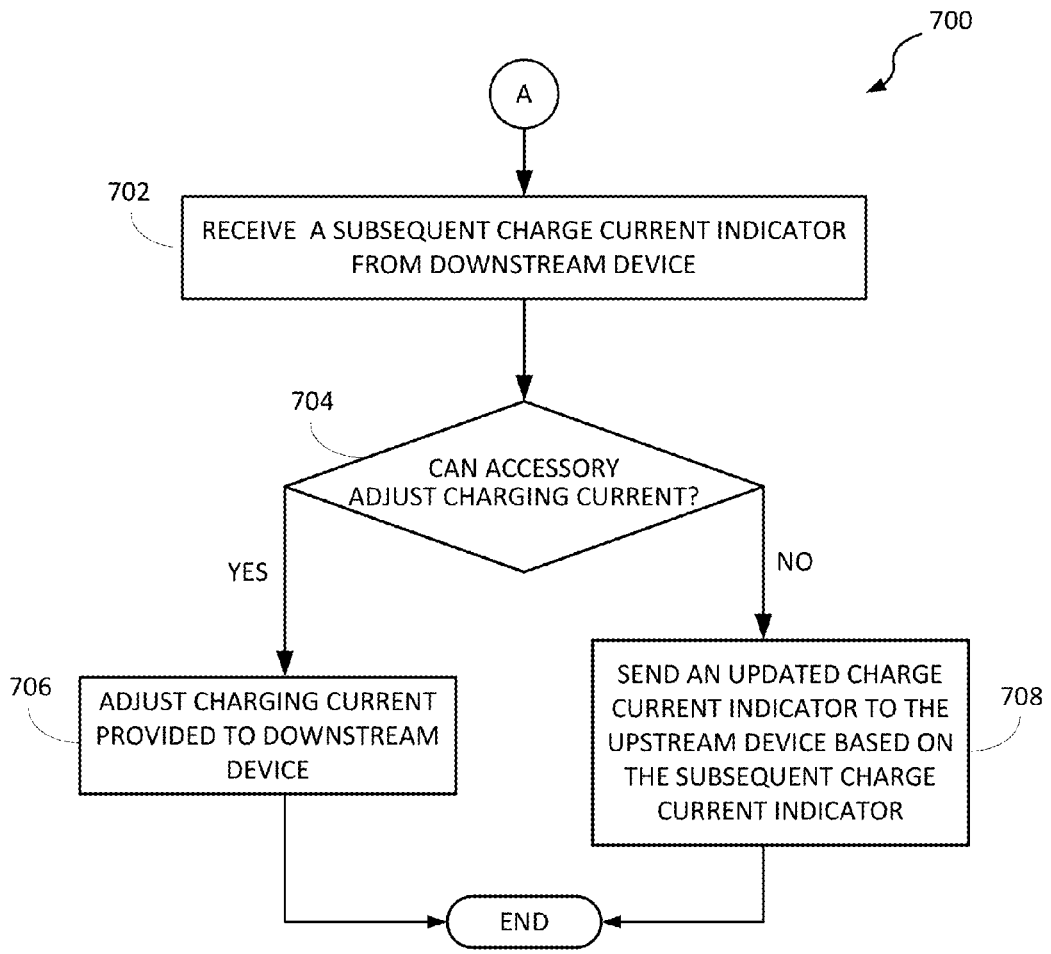
FIG. 7 illustrates a flow diagram of updating a charging current during the charging of a host device through an intermediary accessory according to one embodiment of the present invention.

FIG. 7 illustrates a flow chart 700 for updating the amount of charging current provided to a downstream device by an accessory according to some embodiments. As the battery of the downstream device charges up, the downstream device may send a command that includes a subsequent charge current indicator to the accessory to request the accessory to alter or adjust the amount of charging current being provided to the downstream device. In some embodiments, the subsequent charge current indicator received at the accessory from the downstream device may include a value representing an updated amount of current being requested by the downstream device, or the subsequent charge current indicator may represent an updated charge level of the battery of the downstream device. At block 702, the accessory receives a subsequent charge current indicator from the downstream device. In one embodiment, the downstream device may send the subsequent charge current indicator automatically as the battery of the downstream device charges up to a certain level, or as a predetermined length of charging time has elapsed. In another embodiment, the downstream device may send the subsequent charge current indicator in response to the accessory polling the downstream device for the subsequent charge current indicator. In some embodiments, the accessory may poll the downstream device for the subsequent charge current indicator by sending an ID request to the downstream device at a predetermined time interval Upon receiving the subsequent charge current indicator, at block 704, the accessory determines if the accessory is capable of adjusting, on its own, the charging current provided to the downstream device. For example, if the accessory includes current control circuitry that can control how much charging current is provided to the downstream device, the accessory may determine that it is capable of adjust the charging current provided to the downstream device. In this case, the process continues at block 606 where the accessory adjusts the charging current that is provided to the downstream device according to the subsequent charge current indicator received from the downstream device.

If the accessory lacks current control circuitry, the accessory may determine that it cannot adjust, on its own, the charging current provide to the downstream device. In this case, then at block 708, the accessory may send a command that includes an updated charge current indicator to the upstream device to request the charging source to adjust the amount of current being provided to the accessory. According to some embodiments, the updated charge current indicator being sent to the upstream device may be based on the subsequent charge current indicator received from the downstream device. For example, in one embodiment, the updated charge current indicator may have a value that is the same as the subsequent charge current indicator. In another embodiment, the updated charge current indicator may have a value that is greater than the subsequent charge current indicator received from the downstream device. For example, the updated charge current indicator may take into account the amount of current required to operate the accessory. In one embodiment, the updated current indicator being sent to the upstream device may be a sum of a value representing the amount of current required to operate the accessory and the subsequent charge current indicator sent from the downstream device.

Figure 8A:
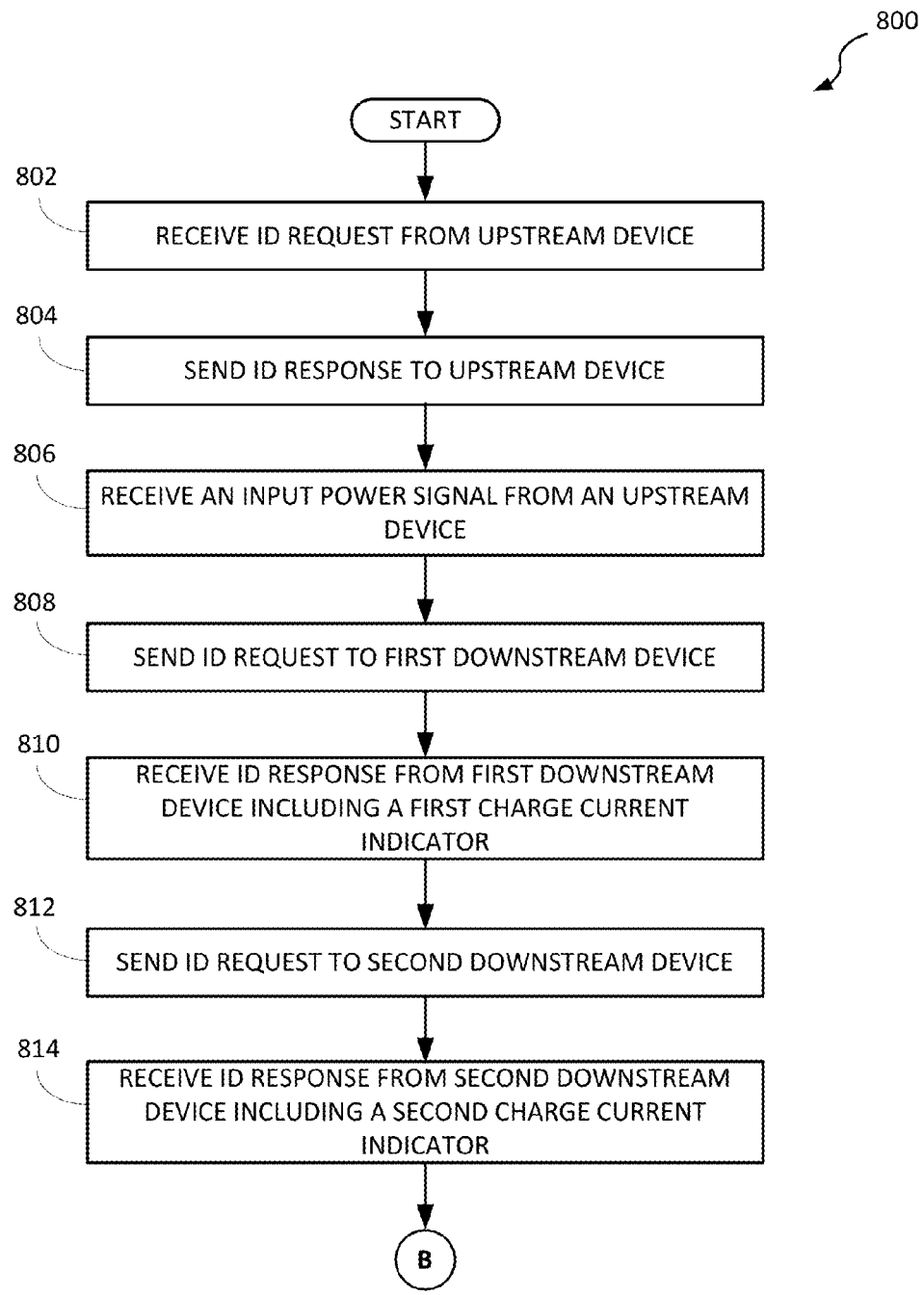
FIGS. 8A-B illustrates a flow diagram of charging multiple host devices through an intermediary accessory according to one embodiment of the present invention.
Figure 8B:
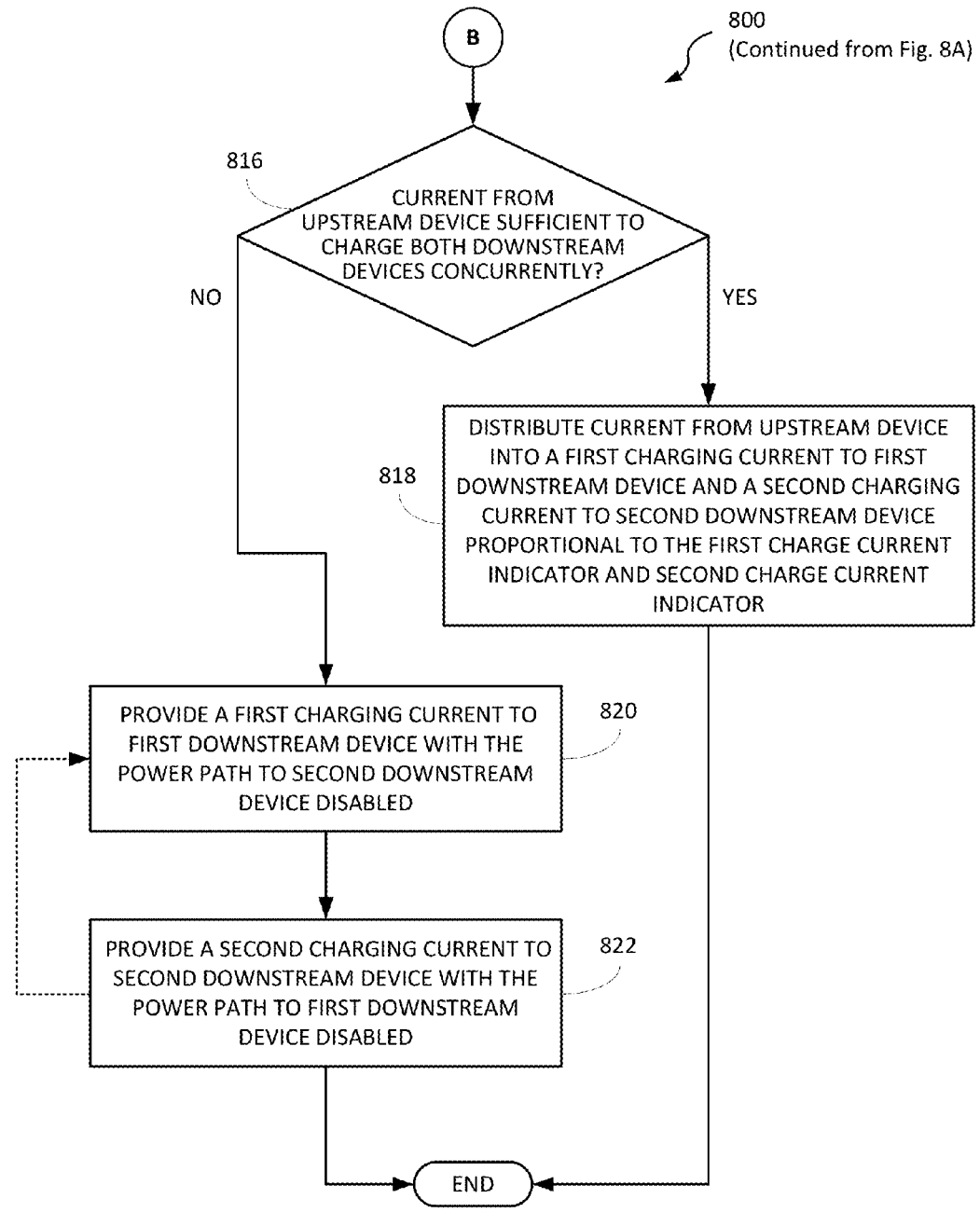

FIG. 8A-B illustrate a flow chart 800 for charging multiple host devices (e.g., two host devices) through an accessory according to some embodiments. Referring to FIG. 8A, at block 802, the accessory may receive an ID request from an upstream device coupled to the accessory. The upstream device can be a charging source or another accessory. At block 804, in response to receiving the ID request from the upstream device, the accessory may sends an ID response to the upstream device. The ID response may include ID information identifying the accessory and may also include a charge current indicator. The upstream device may authenticate the accessory and provide a charging current to the accessory based on the charge current indicator in the ID response. At block 806, the accessory may receive an input power signal from the upstream device. In one embodiment, the input power signal may be the presence of a voltage or a current detected on a power pin of the accessory. In another embodiment, the input power signal may be a change in a voltage level or a current on a power pin of the accessory, for example, an increase from a nominal voltage to a supply voltage on an input power pin, or an increase from a limited current to the charging current being received on an input power pin.

Upon detecting the input power signal from the upstream device, the accessory may provide a limited current to the downstream devices (e.g., two host devices) that are coupled downstream to the accessory. Each downstream device can be a host device or another accessory. It should be understood that in other embodiments, more than two downstream devices can be coupled to the accessory. The limited current provided to each downstream device enables each downstream device to send identification (ID) information to the accessory. Thus, in some embodiments, even when if the battery of a downstream device is dead (i.e. the battery is completely drained, or the battery is drained to the extent that the circuitry of the downstream device responsible for sending the ID information cannot properly operate when using the battery as a power source), that downstream device can still be authenticated by the accessory.

At block 808, the accessory may send an identification (ID) request to the first downstream device to request the first downstream device to send ID information identifying the first downstream device to the accessory. At block 810, the accessory may receive an ID response that includes ID information identifying the first downstream device. The ID response may also include a charge current indicator from the first downstream device. The charge current indicator can be used by the accessory to determine the amount of charging current to provide to the first downstream device upon authenticating the first downstream device.

At block 812, the accessory may send an identification (ID) request to the second downstream device to request the second downstream device to send ID information identifying the second downstream device to the accessory. At block 814, the accessory may receive an ID response that includes ID information identifying the second downstream device. The ID response may also include a charge current indicator from the second downstream device. The charge current indicator can be used by the accessory to determine the amount of charging current to provide to the second downstream device upon authenticating the second downstream device.

Referring now to FIG. 8B, if the downstream devices are authenticated, at block 816, the accessory determines if the current received from the upstream device is sufficient to charge both downstream devices concurrently at the same time in a parallel manner. For example, the accessory may determine that the current received from the upstream device is sufficient, if the current received from the upstream device is greater than or equal to the sum of the current being requested from both downstream devices, or if the current received from the upstream device is greater than the sum of the minimum current requirement to charge the battery of each downstream device according to the specification of the battery and/or downstream device. If the accessory determines that the current received from the upstream device is sufficient, at block 818, the accessory may distribute the current from upstream device into a charging current for the first downstream device and a charging current for the second downstream device. In some embodiments, the respective charging current provided to each downstream device can be proportional to the respective charge current indicators of the downstream devices. In some embodiments, the accessory may receive a subsequent charge current indicator from at least one of the downstream devices. In response, the accessory may adjust and redistribute the current from the upstream device to the downstream devices based on the subsequent charge current indicator.

If the accessory determines that the current received from the upstream device is insufficient to charge both downstream devices concurrently, the accessory may provide only one charging current to one downstream device to charge the downstream devices one at a time in a serial manner. At block 820, the accessory may provide a charging current to the first downstream device while the power path between the upstream device and the second downstream device is disabled. Then at a later time, at block 822, the accessory may provide a charging current to the second downstream device while the power path between the upstream device and the first downstream device is disabled. The accessory may perform this change, for example, when the battery of the first downstream device is charged to a certain level or is fully charged as indicated by a subsequent charge current indicator from the first downstream device, or when the battery of the first downstream device have been charging for a predetermined amount of time. Similarly, the accessory may switch from proving a charging current to the second downstream device back to providing a charging current to the first downstream device. The process may continue back to block 820 (as indicated by the dotted arrow) and be repeated until both downstream devices are fully charged. Switching the charging current back and forth between the two downstream devices before one of the downstream devices is fully charged may allow both downstream devices to have some charge in their respective batteries such that both downstream devices can be turned on sooner (e.g., to exchange data between the two downstream devices) than if the accessory waits until one downstream device is fully charged before performing the switch.

It should be understood that although the flow charts and methods of FIGS. 7-8 have been described with reference to a host device and a charging source, similar steps and operations can be performed by an accessory that is coupled between an upstream device that may be another accessory and a downstream device that may also be another accessory.

Figure 9:
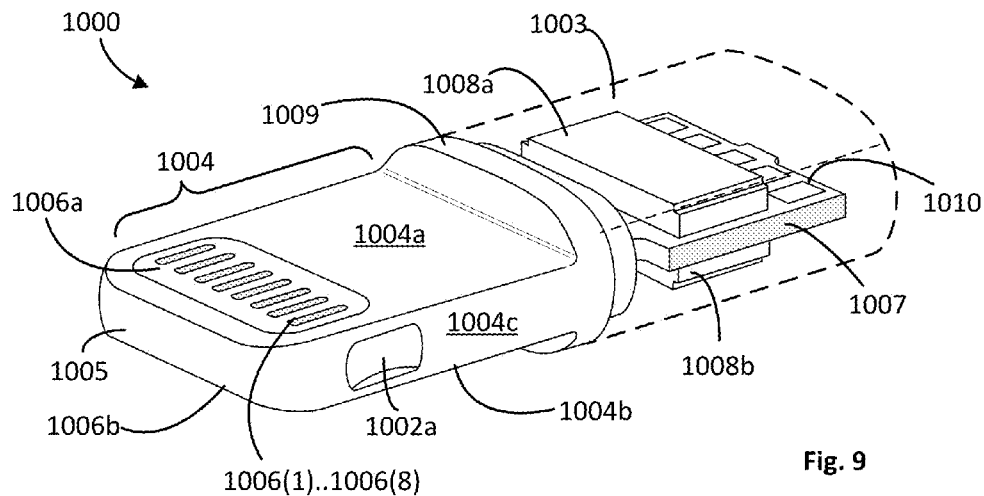
FIG. 9 illustrates a perspective view of a plug connector according to an embodiment of the present invention.

FIG. 9 illustrates a simplified perspective view of one embodiment of a plug connector 1000 that can be used to implement some of the connectors described above. As shown in FIG. 9, plug connector 1000 includes a body 1003 and a tab portion 1004 that extends longitudinally away from body 1003 in a direction parallel to the length of the connector. Tab portion 1004 is sized to be inserted into a corresponding receptacle connector during a mating event. Tab portion 1004 includes a first contact region 1006a formed on a first major surface 1004a and a second contact region 1006b formed at a second major surface 1004b opposite of surface 1004a. Surfaces 1004a and 1004b extend from a distal tip of tab portion 1004 to a spine 1009. When tab portion 1004 is inserted into a corresponding host receptacle connector, spine 1009 abuts the housing of the host receptacle connector or the host device. Tab portion 1004 also includes first and second opposing side surfaces 1004c and 1004d that extend between the first and second major surfaces 1004a and 1004b. In one particular embodiment, tab portion 1004 is 6.6 mm wide, 1.5 mm thick and has an insertion depth (the distance from the tip of tab portion 1004 to spine 1009) of 7.9 mm.

The structure and shape of tab portion 1004 is defined by a ground ring 1005 that can be made from stainless steel or another hard conductive material. Plug connector 1000 includes retention features 1002a and 1002b formed as curved pockets in the sides of ground ring 1005 that can also be used as ground contacts. Body 1003 is shown in FIG. 9 in transparent form (via dotted lines) so that certain components inside body 1003 are visible. As shown, within body 1003 is a printed circuit board (PCB) 1007 that extends into ground ring 1005 between contact regions 1006*a* and 1006*b* towards the distal tip of plug connector 1000. One or more integrated circuits (ICs), such as Application Specific Integrated Circuit (ASIC) chips 1008*a* and 1008*b*, can be coupled to PCB 1007 to provide information about the device associated with connector 1000 and/or to perform specific functions, such as authentication, identification, contact configuration, current or power regulation, and/or signal and/or power conversion.

Bonding pads 1010 can also be formed within body 1003 near the end of PCB 1007. Each bonding pad can be connected to a contact or contact pair within contact regions 1006*a* and 1006*b*. Wires (not shown) can then be soldered to the bonding pads to provide an electrical connection from the contacts to circuitry within the device associated with connector 1000. In some embodiments, however, bonding pads are not necessary and instead all electrical connections between the contacts and components of plug connector 1000 and other circuitry within the device associated with connector 1000 are made through traces on a PCB that the circuitry is coupled to and/or by interconnects between multiple PCBs within the device associated with connector 1000.

As shown in FIG. 9, up to eight external contacts 1006(1) ... 1006(8) can be spaced apart along a single row in contact region 1006*a*. A similar set of eight contacts (not shown) can be spaced apart along a single row in contact region 1006*b*. The two rows of contacts are directly opposite each other and each contact in contact region 1006*a* is electrically connected to a corresponding contact in contact region 1006*b* on the opposite side of the connector. Contacts 1006(1) ... 1006(8) can be used to carry a wide variety of signals including digital signals and analog signals as well as power and ground. When plug connector 1000 is properly engaged with a receptacle connector, each of contacts 1006(1)-1006(8) is in electrical connection with a corresponding contact of the receptacle connector.

Figure 10A:
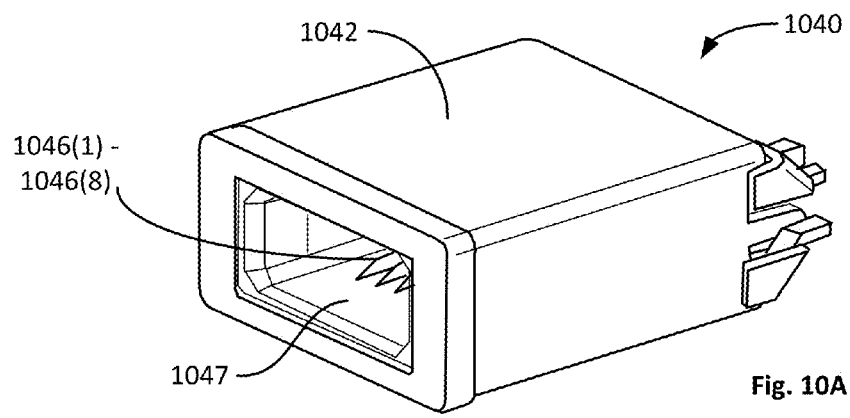
FIG. 10A illustrates a perspective view of a receptacle connector that is compatible with a plug connector according to an embodiment of the present invention.

FIG. 10A illustrates a simplified perspective view of one embodiment of a receptacle connector 1040 that plug connector 1000 can be coupled with. Receptacle connector 1040 includes a housing 1042 that defines a cavity 1047 and houses up to eight contacts 1046(1)-1046(8) within cavity 1047. Housing 1042 can be integrated into a housing of a host device. In operation, a connector plug, such as plug connector 1000 can be inserted into cavity 1047 to electrically couple the contacts 1006(1)-1006(8) to respective contacts 1046(1)-1046(8). Each of the receptacle contacts 1046(1)-1046(8) electrically connects its respective plug contact to circuitry associated with the electrical device (e.g., a host device) in which receptacle connector 1040 is housed. Note that receptacle connector 1040 includes contacts on a single side so it can be made thinner. In other embodiments, receptacle connector 1040 may have contacts on each side while plug connector 1000 may only have contacts on a single side.

Figure 10B:
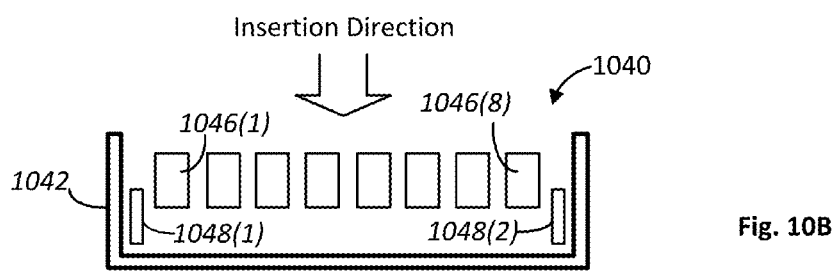
FIG. 10B illustrates a planar cross-section view of a receptacle connector that is compatible with a plug connector according to an embodiment of the present invention.

FIG. 10B illustrates a planar cross-section view of receptacle connector 1040. As shown in FIG. 10B, contacts 1046(1)-1046(8) in receptacle connector 1040 are spaced apart in a single row. The contacts are positioned within a cavity 1047 that is defined by a housing 1042. Receptacle connector 1040 also includes side retention mechanisms 1046*a* and 1046*b* (not shown) that engage with retention features 1002*a* and 1002*b* in plug connector 1000 to secure plug connector 1000 within cavity 1047 once the connectors are mated. Receptacle connector 1040 also includes two contacts 1048(1) and 1048(2) that are positioned slightly behind the row of signal contacts and can be used to detect when plug connector 1000 is inserted within cavity 1047 and detect when plug connector 1000 exits cavity 1047 when the connectors are disengaged from each other.

When tab portion 1004 of plug connector 1000 is fully inserted within cavity 1047 of receptacle connector 1040 during a mating event, each of contacts 1006(1) ... 1006(8) from contact region 1006*a* or contacts from 1006*b* are physically and electrically coupled to one of contacts 1046(1) ... 1046(8) depending on the insertion orientation of plug connector 1000 with respect to receptacle connector 1040. Thus, contact 1046(1) will be physically connected to either contact 1006(1) or 1006(8) depending on the insertion orientation; data contacts 1046(2) and 1046(3) will connect with either data contacts 1006(2) and 1006(3) or with data contacts 1006(7) and 1006(6) depending on the insertion orientation, etc.

Figure 11A:
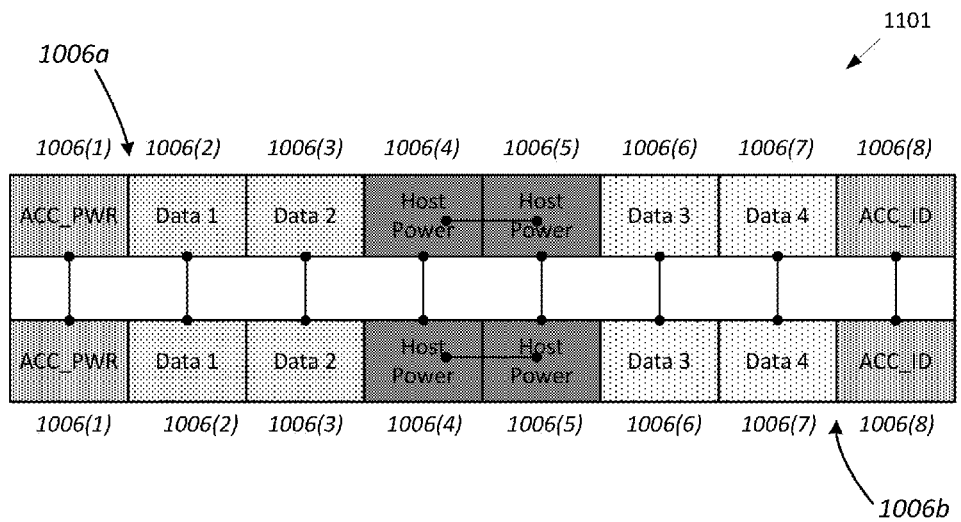
FIG. 11A illustrates an exemplary pin-out of a connector according to an embodiment of the present invention.

FIG. 11A illustrates one particular implementation of a pin-out 1101 for plug connector 1000 (or a pin-out for a compatible receptacle connector 1040), according to one embodiment of the invention. On one side of plug connector 1000 for contact region 1006*a*, pin-out 1101 shown in FIG. 11A includes two host power contacts 1006(4) and 1006(5) that are electrically coupled together to function as a single contact dedicated to carrying power; an accessory ID contact 1006(8); an accessory power contact 1006(1); and four data contacts 1006(2), 1006(3), 1006(6) and 1006(7). Host power contacts 1006(4) and 1006(5) can be sized to handle any reasonable power requirement for a host device, and for example, can be designed to carry between 3-20 Volts from an accessory to charge a host device connected to plug connector 1000. Host power contacts 1006(4) and 1006(5) are positioned in the center of contact regions 1006*a* and 1006*b* to improve signal integrity by keeping power as far away as possible from the sides of ground ring 1005.

Accessory power contact 1006(1) can be used for an accessory power signal that provides power from the host to an accessory. The accessory power signal is typically a lower voltage signal than the power in signal received over host power contacts 1006(4) and 1006(5), for example, 3.3 Volts as compared to 5 Volts or higher. The accessory ID contact 1006(8) provides a communication channel that enables a host device to authenticate an accessory and enables an accessory to communicate information to the host device about the accessory's capabilities.

Figure 11B:
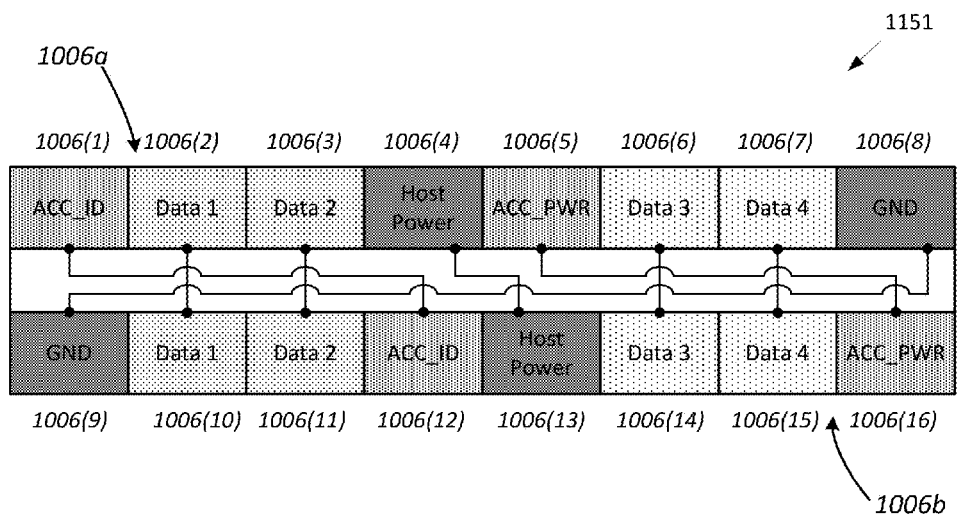
FIG. 11B illustrates an exemplary pin-out of a connector according to another embodiment of the present invention.

Data contacts 1006(2), 1006(3), 1006(6) and 1006(7) can be used for data communication between the host device and accessory using one or more communication protocols. Data contacts 1006(2) and 1006(3) are positioned adjacent to and on one side of the host power contacts 1006(4) and 1006(5), while data contacts 1006(6) and 1006(7) are positioned adjacent to but on the other side of the host power contacts 1006(4) and 1006(5). The accessory power contact 1006(1) and accessory ID contact 1006(8) are positioned at each end of the connector. The data contacts can be high speed data contacts that operate at rate that is two or three orders of magnitude faster than any signals sent over the accessory ID contact 1006(8) which causes the accessory ID signal to appear essentially as a DC signal to the high speed data lines. Thus, positioning the data contacts 1006(2) and 1006(3) between accessory power contact 1006(1) and host power contact 1006(4), and positioning the data contacts 1006(6) and 1006(7) between host power contact 1006(5) and accessory ID contact 1006(8), improve signal integrity by sandwiching the data signals between contacts designated for DC signals or essentially DC signals FIG. 11B illustrates another particular implementation of a pin-out 1151 for plug connector 1000 (or a pin-out for a compatible receptacle connector 1040) according to another embodiment of the invention. Similar to pin-out 1101, the plug connector having pin-out 1151 is a reversible connector. In other words, based on the orientation in which the plug connector is mated with a corresponding host connector of a host device, either the contacts on the contact region 1006*a* or 1006*b* are in physical and electrical contact with the contacts in the corresponding host connector of the host device. As illustrated in FIG. 11B, there are eight contacts arranged within contact region 1006*a* and eight contacts arranged within contact region 1006*b*.

Pin-out 1151 shown in FIG. 11B includes two contacts 1006(1) and 1006(12) that can function as accessory ID contacts to carry the adapter identification signals between adapter 40 and the host device. Contacts 1006(1) and 1006 (12) are electrically connected to each other. The pin-out shown in FIG. 11B can have four pairs of data contacts: (a) 1006(2) and 1006(3); (b) 1006(6) and 1006(7); (c) 1006(10) and 1006 (12); and (d) 1006(14) and 1006(15). In this particular embodiment, opposing data contacts, e.g., 1006(2) and 1006(10), are electrically connected to each other. Pin-out 1151 further includes host power contacts 1006(4) or 1006(13) that may be electrically connected to each other. Host power contacts 1006(4) or 1006(13) carry power to the host device that is mated with plug connector 1000. For example, plug connector 1000 may be part of a power supply system designed to provide power to the host device. In this instance, either host power contact 1006(4) or 1006(13) may carry power from the power supply to the host device, e.g., to charge a battery in the host device.

Pin-out 1151 of FIG. 11B may further include accessory power contacts 1006(5) and 1006(16) that may be electrically connected to each other. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of plug connector 1000. Pin-out 1151 of FIG. 11B may further include two ground contacts 1006(8) and 1006(9) electrically connected to each other. The ground contacts provide a ground path for plug connector 1000.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. An accessory comprising:
   a power module; and
   an identification (ID) module coupled to the power module, wherein the ID module is configured to:
   send a signal to the power module to supply a limited current to a downstream device in response to detecting an input power signal from an upstream device coupled to the accessory;
   send an ID request to the downstream device;
   receive ID information from the downstream device;
   authenticate the downstream device based on the ID information; and
   send a signal to the power module to enable a power path between the upstream device and the downstream device to supply a charging current greater than the limited current to the downstream device such that the downstream device can be operated in a normal mode and can provide a limited current to a downstream host connected to the downstream device.

2. The accessory of claim 1, wherein the ID information comprises a charge current indicator that is used by the accessory to determine an amount of charging current to provide to the downstream device.

3. The accessory of claim 2, wherein the charge current indicator comprises a value identifying a charge level of a battery of the downstream device.

4. The accessory of claim 3, wherein the ID module is configured to send, a command to the upstream device, wherein the command comprises the value identifying the charge level of the battery of the downstream device.

5. The accessory of claim 2, wherein the charge current indicator comprises a value representing an amount of current requested by the downstream device.

6. The accessory of claim 5, wherein the ID module is configured to send a command to the upstream device comprising a value representing at least the amount of current requested by the downstream device.

7. The accessory of claim 2, wherein the power path is maintained in a disabled state if the downstream device is not authenticated.

8. A method comprising:
   receiving, by an accessory, an input power signal from an upstream device;
   sending a signal to a power module to supply a limited current to a downstream device;
   sending, by the accessory, an identification (ID) request to the downstream device;
   receiving, by the accessory, an ID response from the downstream device, wherein the ID response includes a charge current indicator;
   authenticating, by the accessory, the downstream device based on the ID response; and
   enabling, by the accessory, a power path between the upstream device and the downstream device to provide a charging current to the downstream device, wherein the charging current provided to the downstream device is based on the charge current indicator and the downstream device operates in a normal mode and can provide a limited current to a downstream host connected to the downstream device and temporarily incapable of authentication.

9. The method of claim 8, wherein the charge current indicator comprises a value identifying a charge level of a battery of the downstream device.

10. The method of claim 8, wherein the charge current indicator comprises a value representing an amount of current requested by the downstream device.

11. The method of claim 8, wherein the limited current to the downstream device enables the downstream device to send the ID response.

12. The method of claim 8, further comprising:
maintaining the power path in a disabled state if the ID response from the downstream device is not recognized by the accessory.

13. The method of claim 8, further comprising:
adjusting the charging current based on a subsequent charge current indicator received from the downstream device.

14. The method of claim 13, wherein the subsequent charge current indicator represents an updated charge level of the battery of the downstream device.

15. The method of claim 13, further comprising:
polling the downstream device at a predetermined time interval to request the subsequent charge current indicator.

16. A method comprising:
receiving, by an accessory, an input power signal from an upstream device;
supplying a limited current to a first downstream device;
sending, by the accessory, a first identification (ID) request to the first downstream device;
receiving, by the accessory, a first ID response from the first downstream device, wherein the first ID response includes a first charge current indicator;
authenticating, by the accessory, the first downstream device based on the first ID response;
sending, by the accessory, a second ID request to a second downstream device;
receiving, by the accessory, a second ID response from the second downstream device, wherein the second ID response includes a second charge current indicator;
authenticating, by the accessory, the second downstream device based on the second ID response;
distributing, by the accessory, a current from the upstream device to the first and second downstream devices based on the first and second charge current indicators such that the second downstream device can be operated in a normal mode and can provide a limited current to a downstream host connected to the second downstream device wherein the downstream host is temporarily incapable of authentication.

17. The method of claim 16, further comprising:
receiving a subsequent charge current indicator from at least one of the first and second downstream devices; and
redistributing, by the accessory, the current from the upstream device to the first and second downstream devices based in part on the subsequent charge current indicator.

18. The method of claim 16, wherein at least one of the first and second charge current indicators represents a charge level of the battery of the respective downstream device.

19. The method of claim 16, wherein at least one of the first and second charge current indicators comprises a value representing an amount of current requested by the respective downstream device.

20. The method of claim 19, wherein a first charging current is provided to the first downstream device and a second charging current is provided to the second downstream device, wherein the first and second charging current are proportional to the values of the first and second charge current indicators, respectively.

21. The method of claim 16, wherein distributing the current from the upstream device comprises providing a first charging current to the first downstream device while a power path between the upstream device and the second downstream device is disabled.

* * * * *